US007866565B2

(12) United States Patent
Toda

(10) Patent No.: US 7,866,565 B2
(45) Date of Patent: Jan. 11, 2011

(54) APPARATUS FOR PRODUCING RFID LABELS, CARTRIDGE FOR INCLUDING AT LEAST A RFID TAG, AND RFID LABEL MANUFACTURING SYSTEM

(75) Inventor: Katsumi Toda, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 314 days.

(21) Appl. No.: 12/052,574

(22) Filed: Mar. 20, 2008

(65) Prior Publication Data
US 2008/0240828 A1 Oct. 2, 2008

(30) Foreign Application Priority Data
Mar. 26, 2007 (JP) ............................. 2007-080092

(51) Int. Cl.
*G06K 19/06* (2006.01)
(52) U.S. Cl. .................. 235/492; 235/375; 235/383; 235/451; 235/487; 340/572.1; 340/572.2
(58) Field of Classification Search ................. 235/375, 235/451, 487, 492, 383; 340/572.01–572.7
See application file for complete search history.

(56) References Cited

U.S. PATENT DOCUMENTS

| 5,838,253 | A * | 11/1998 | Wurz et al. ............... 340/10.42 |
| 7,261,479 | B2 * | 8/2007 | Barrus et al. .................. 400/76 |
| 2005/0116034 | A1 * | 6/2005 | Satake et al. ................. 235/432 |
| 2005/0198811 | A1 * | 9/2005 | Kurz et al. ..................... 29/601 |
| 2005/0274800 | A1 * | 12/2005 | Chapman et al. ............ 235/432 |
| 2006/0082446 | A1 * | 4/2006 | Dods ........................ 340/10.51 |
| 2006/0170557 | A1 * | 8/2006 | Berson ..................... 340/572.8 |
| 2007/0023516 | A1 * | 2/2007 | Chapman et al. ............. 235/432 |
| 2007/0039687 | A1 * | 2/2007 | Hamilton et al. ............. 156/264 |

(Continued)

FOREIGN PATENT DOCUMENTS

JP 2000339422 A 12/2000

(Continued)

OTHER PUBLICATIONS

Japan Patent Office, Notice of Reasons for Rejection in counterpart Patent Application No. JP 2007-080092 mailed Aug. 13, 2009.

*Primary Examiner*—Thien M. Le
*Assistant Examiner*—Tuyen K Vo
(74) *Attorney, Agent, or Firm*—Baker Botts, LLP

(57) ABSTRACT

An apparatus for producing RFID labels includes a feeding roller drive shaft configured to feed a base tape provided with a plurality of types of RFID circuit elements having an IC circuit part storing information and a tag antenna and corresponding to each of a plurality of types of communication frequency, and an antenna configured to perform information transmission and reception using the plurality of types of communication frequencies with respect to the plurality of types of the RFID circuit elements of a tag label tape with print being fed, and when a RFID label production command for producing a RFID label is input from an operation terminal, a central control part control in coordination so that the plurality of types of RFID labels using the plurality of types of RFID circuit elements, respectively, corresponding to the command is produced in a lump sum.

4 Claims, 17 Drawing Sheets

U.S. PATENT DOCUMENTS

2009/0063001 A1 * 3/2009 Ueda et al. .................... 701/79

FOREIGN PATENT DOCUMENTS

| JP | 2004295297 A | 10/2004 |
| JP | 2005094474 A | 4/2005 |
| JP | 2005-280224 A | 10/2005 |
| JP | 2005-346128 A | 12/2005 |
| JP | 2006-099502 A | 4/2006 |

* cited by examiner

[FIG. 1]
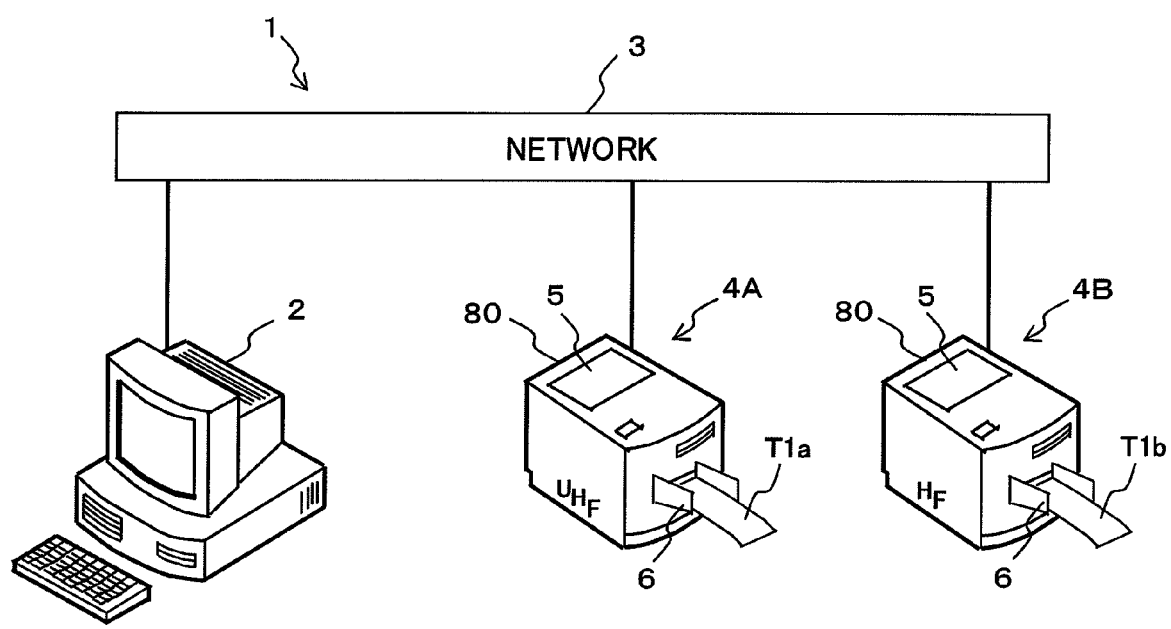

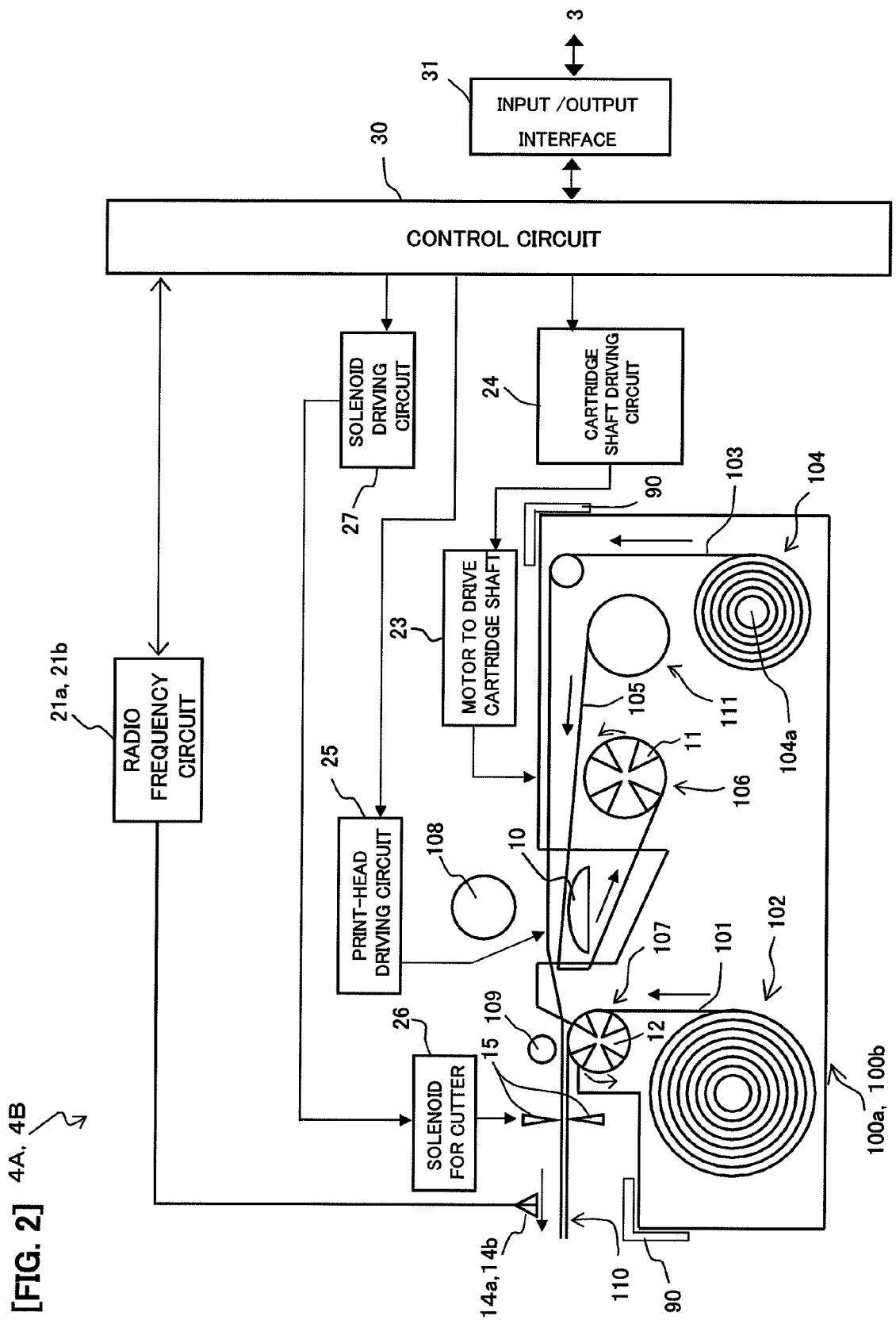

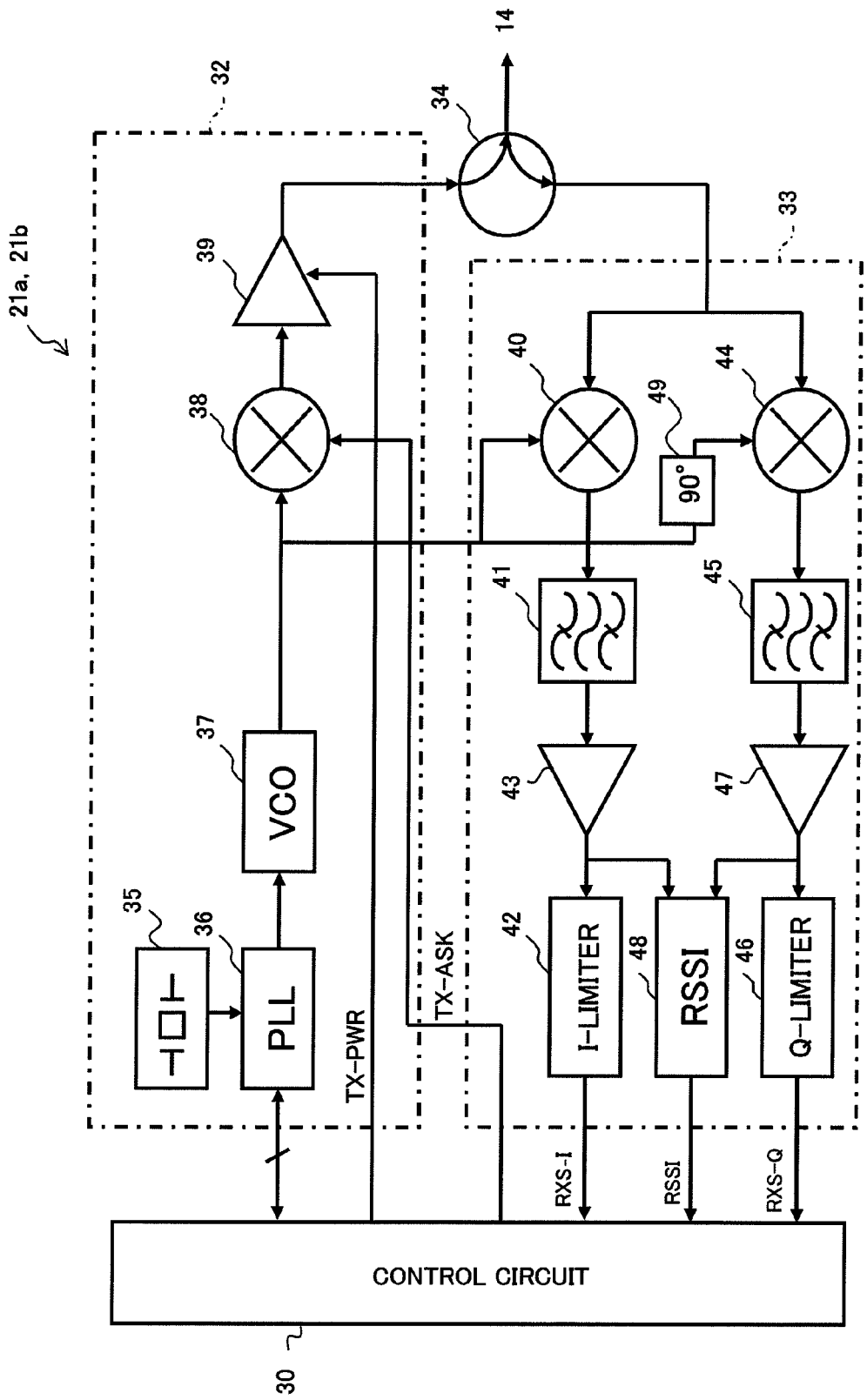
[FIG. 3]

[FIG. 4]
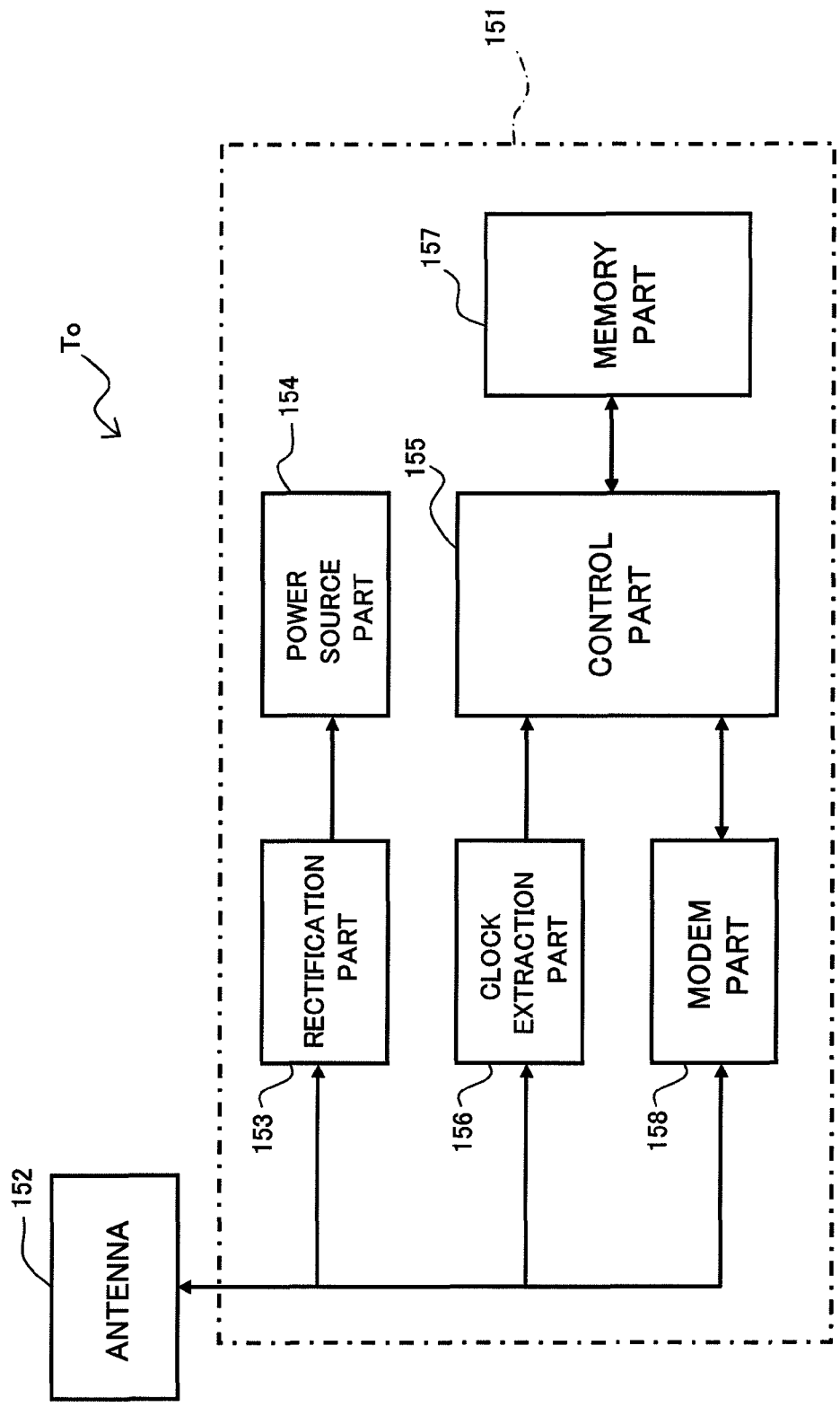

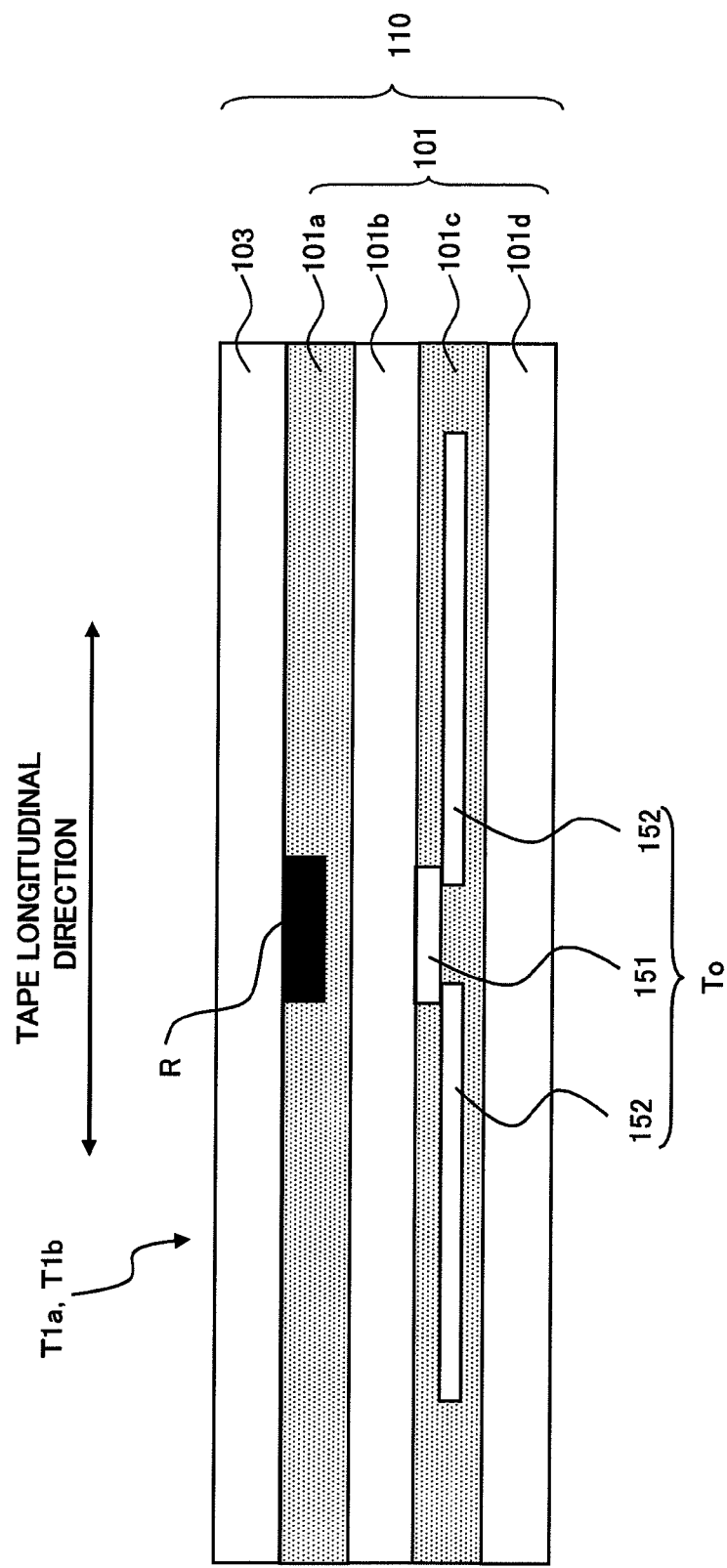

[FIG. 6]
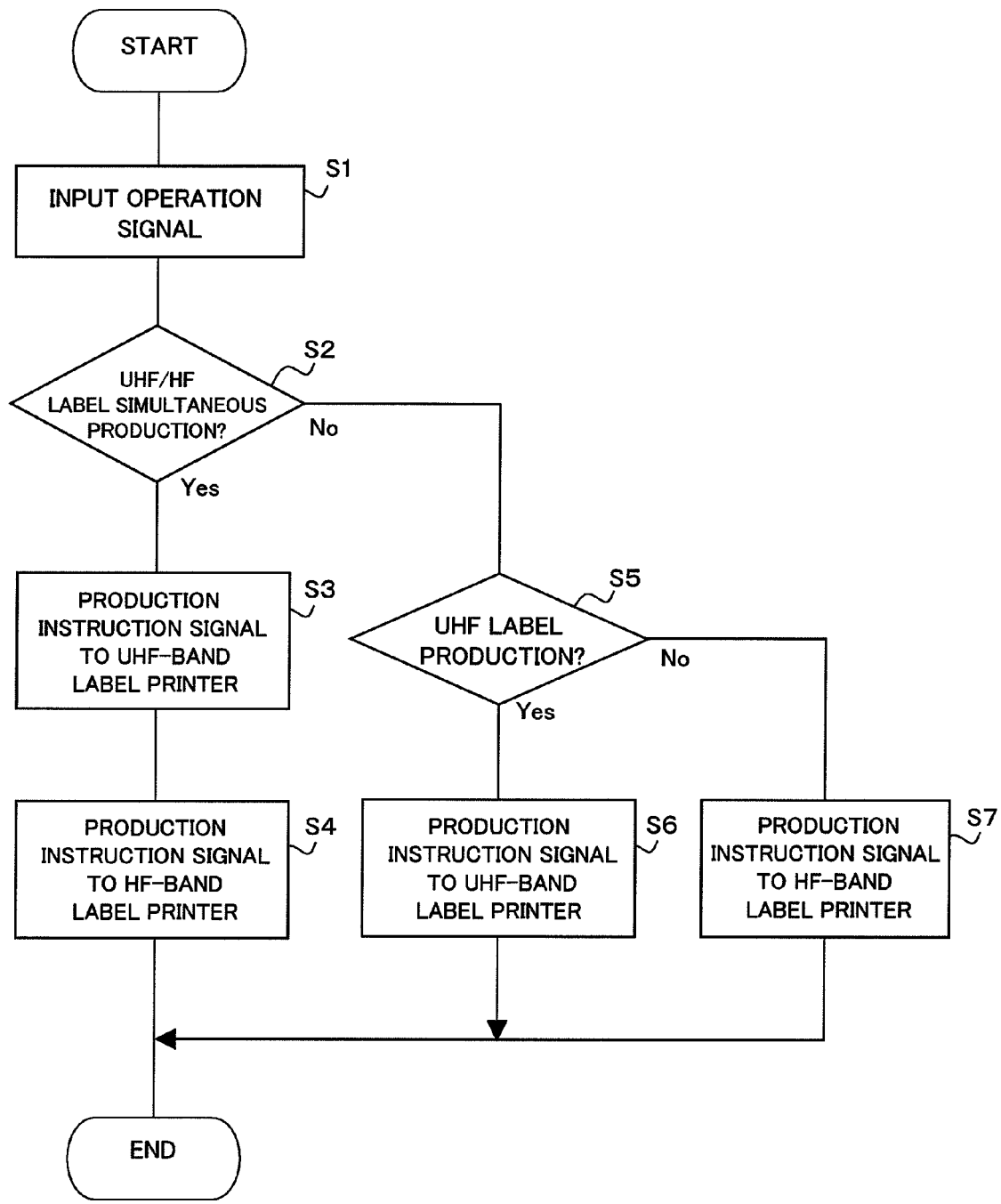

[FIG. 7]
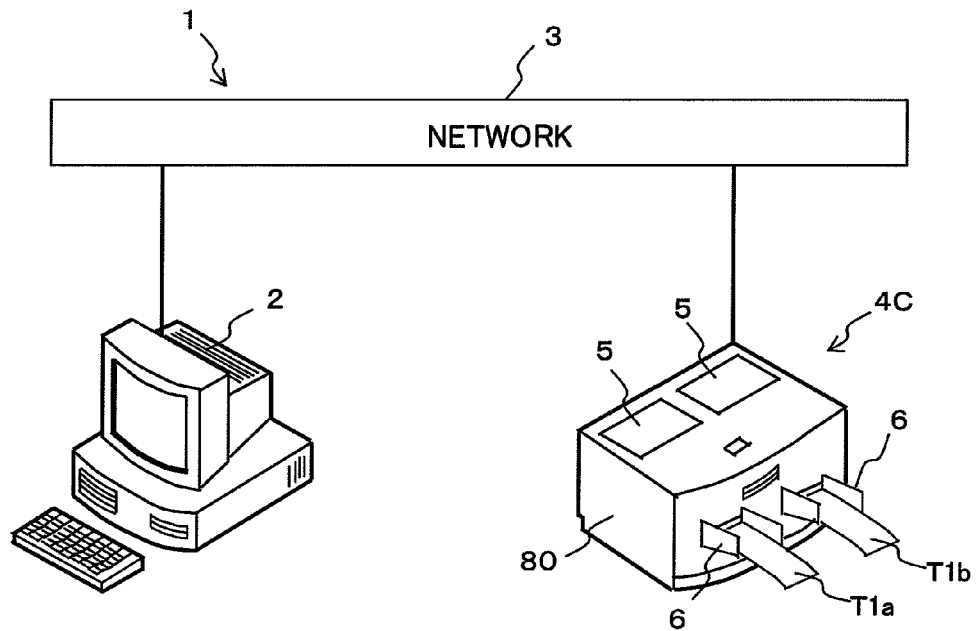
[FIG. 8]
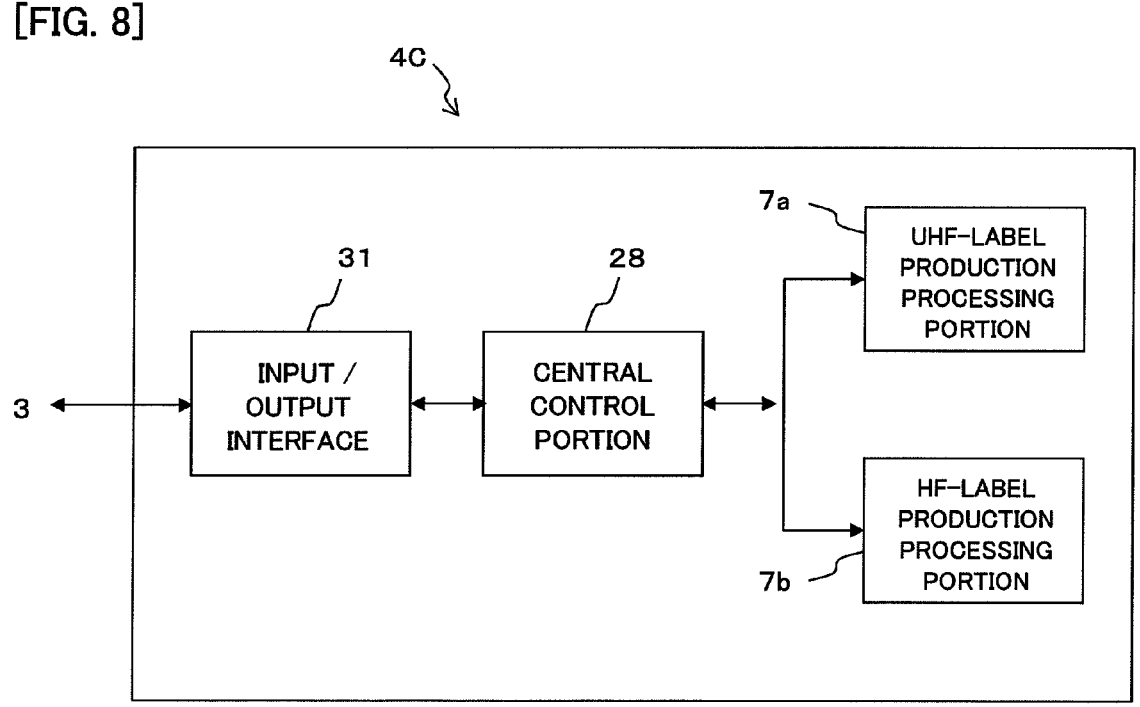

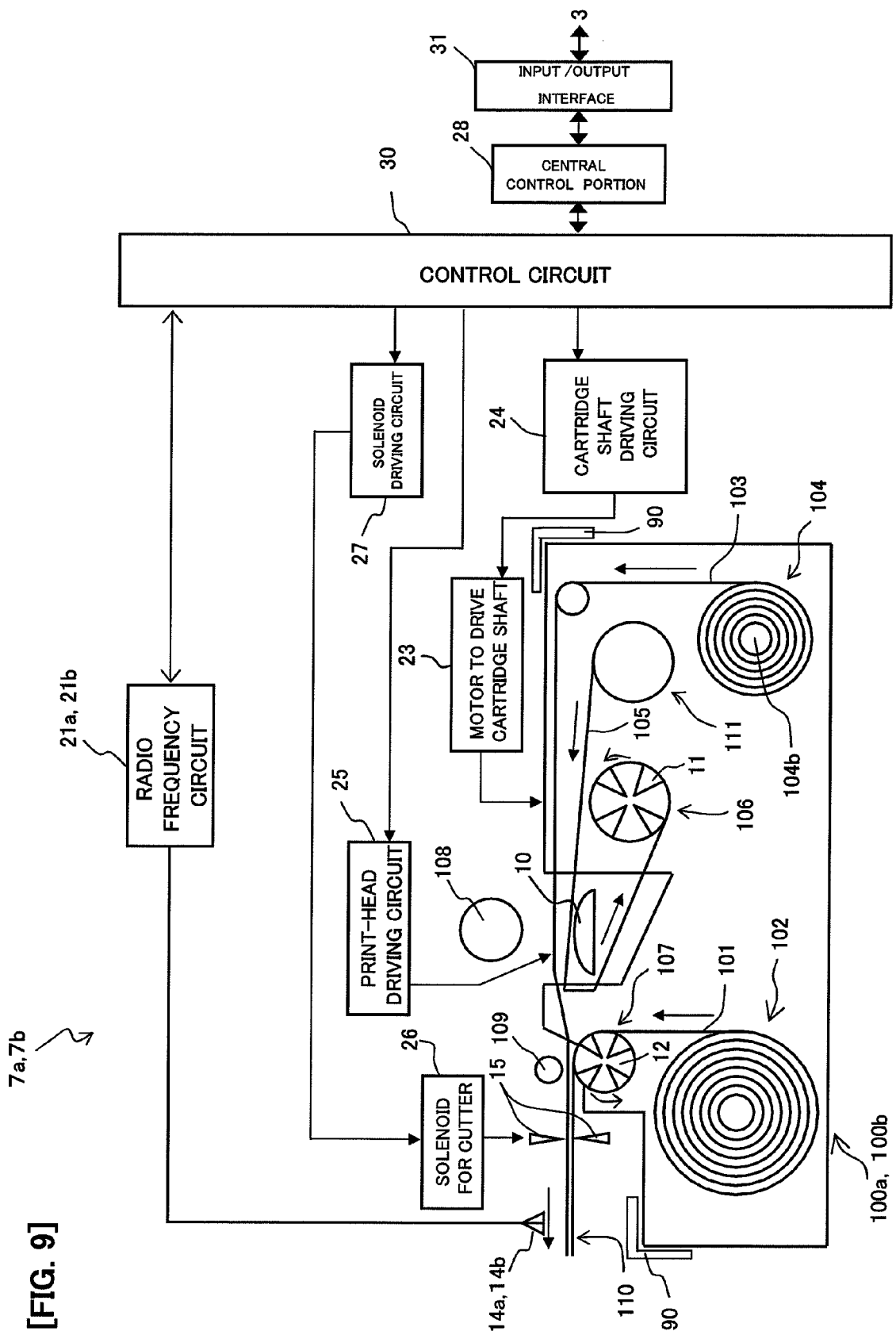
[FIG. 9]

[FIG. 10]
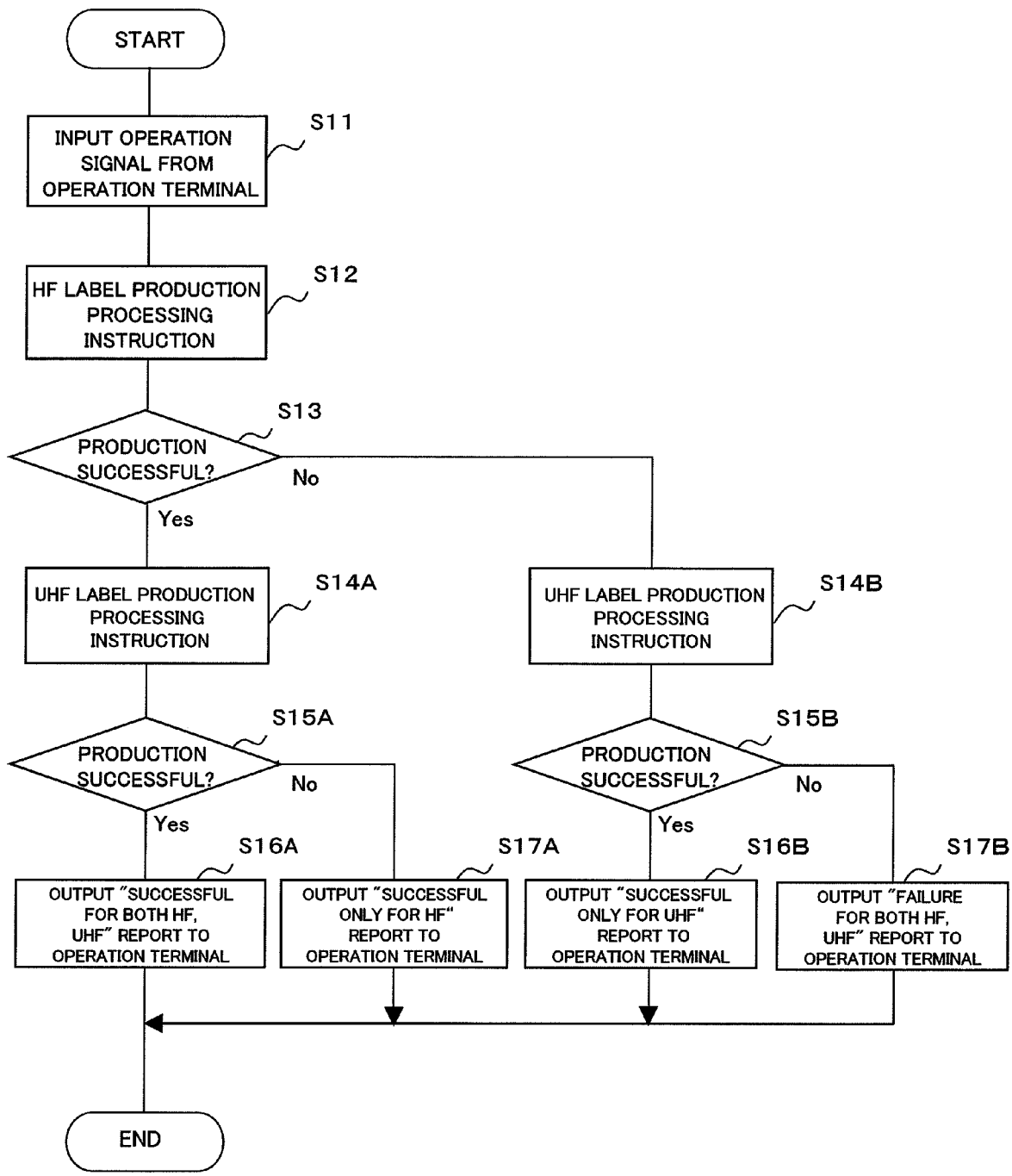

[FIG. 11]
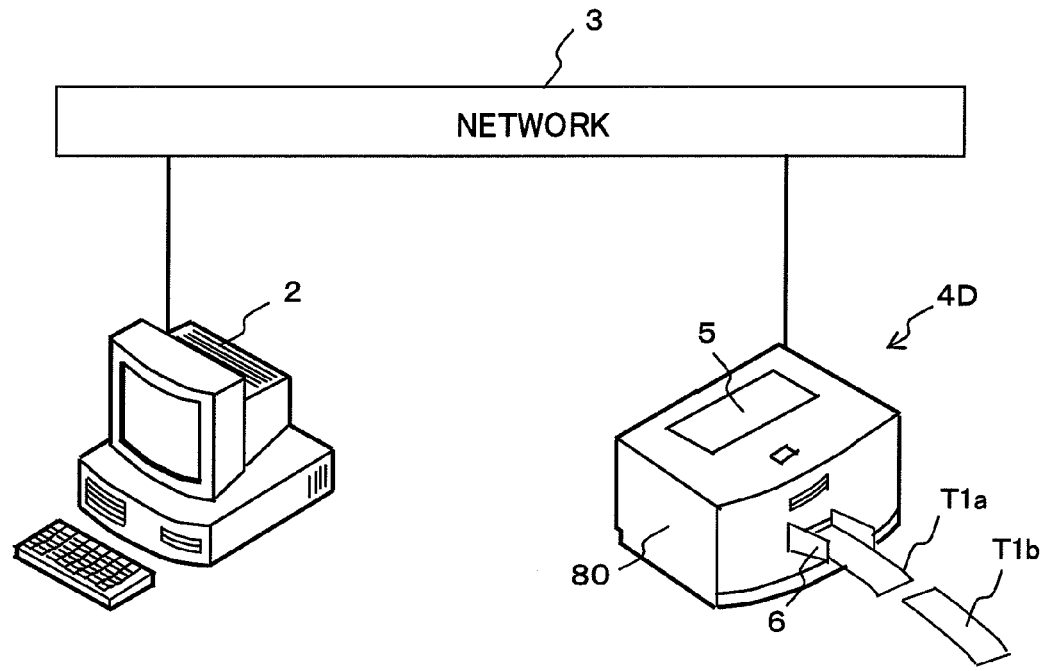
[FIG. 12]
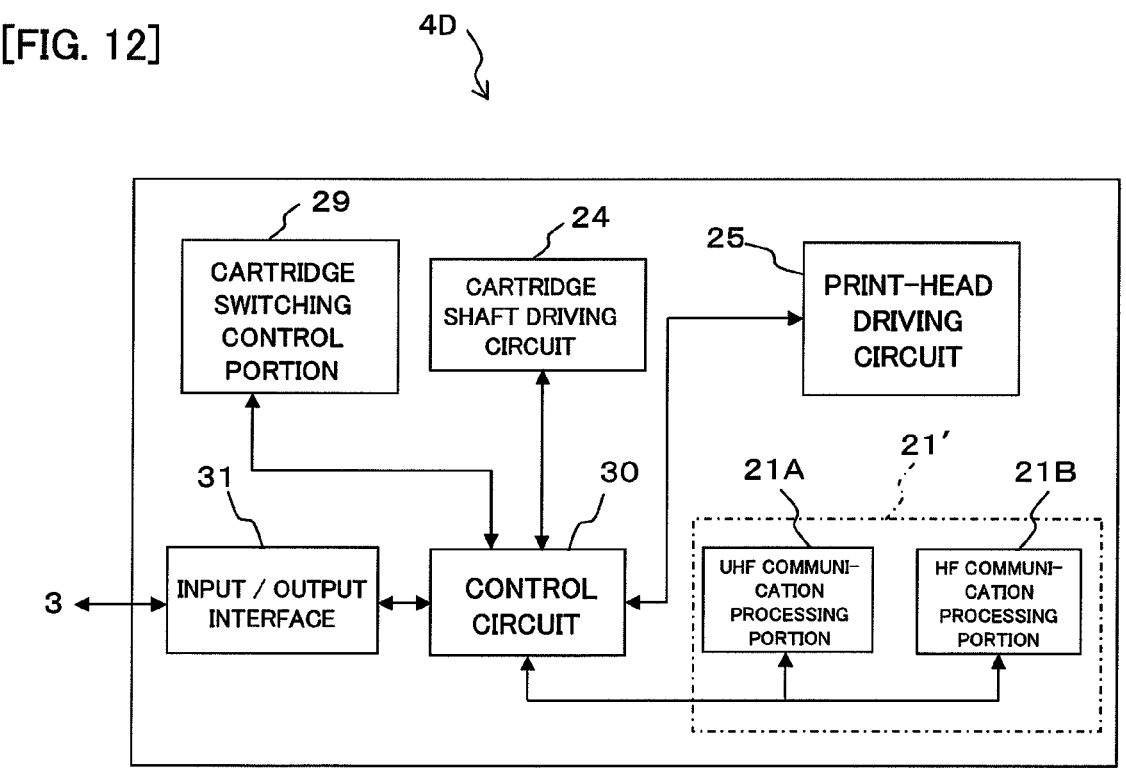

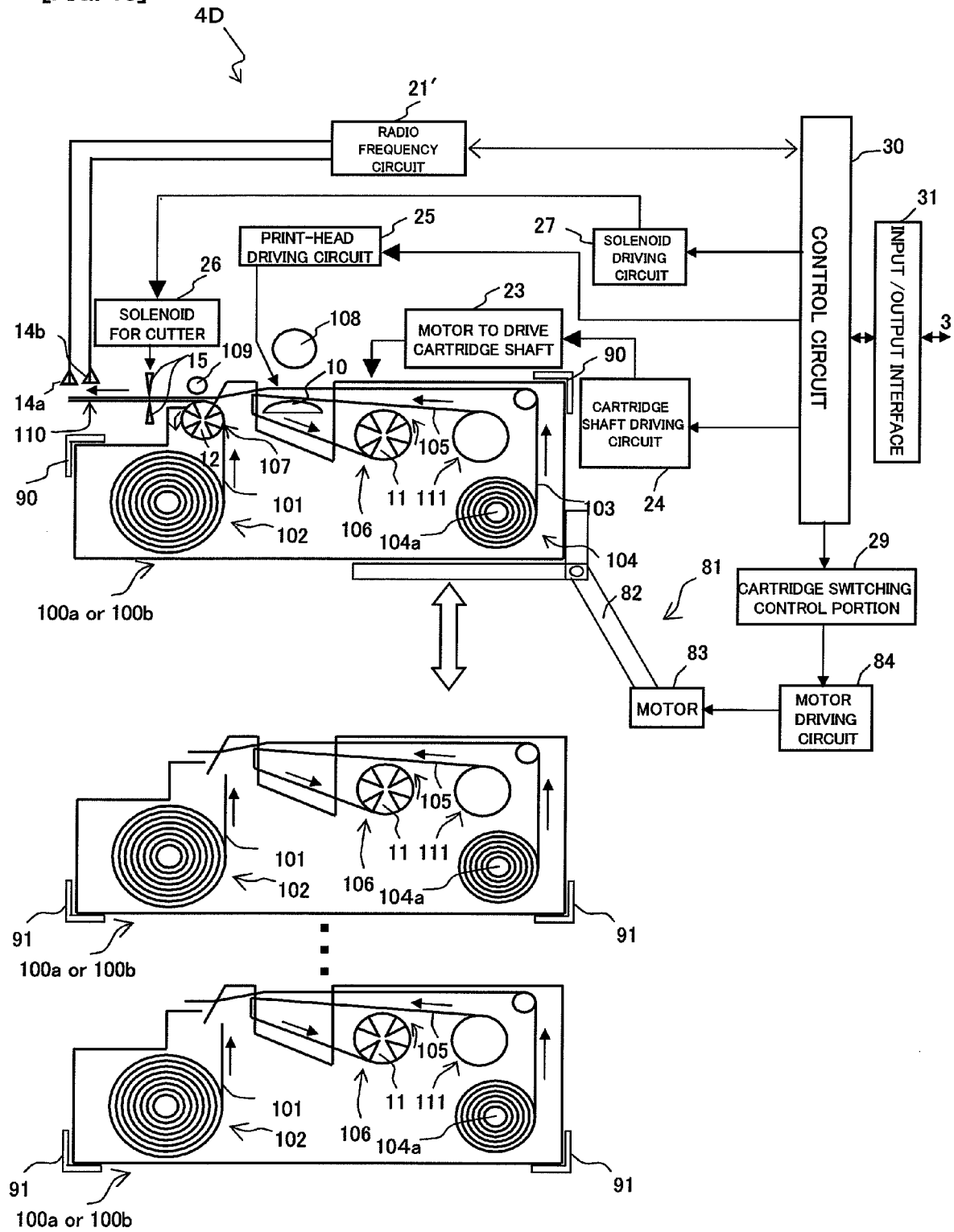
[FIG. 13]

[FIG. 14]
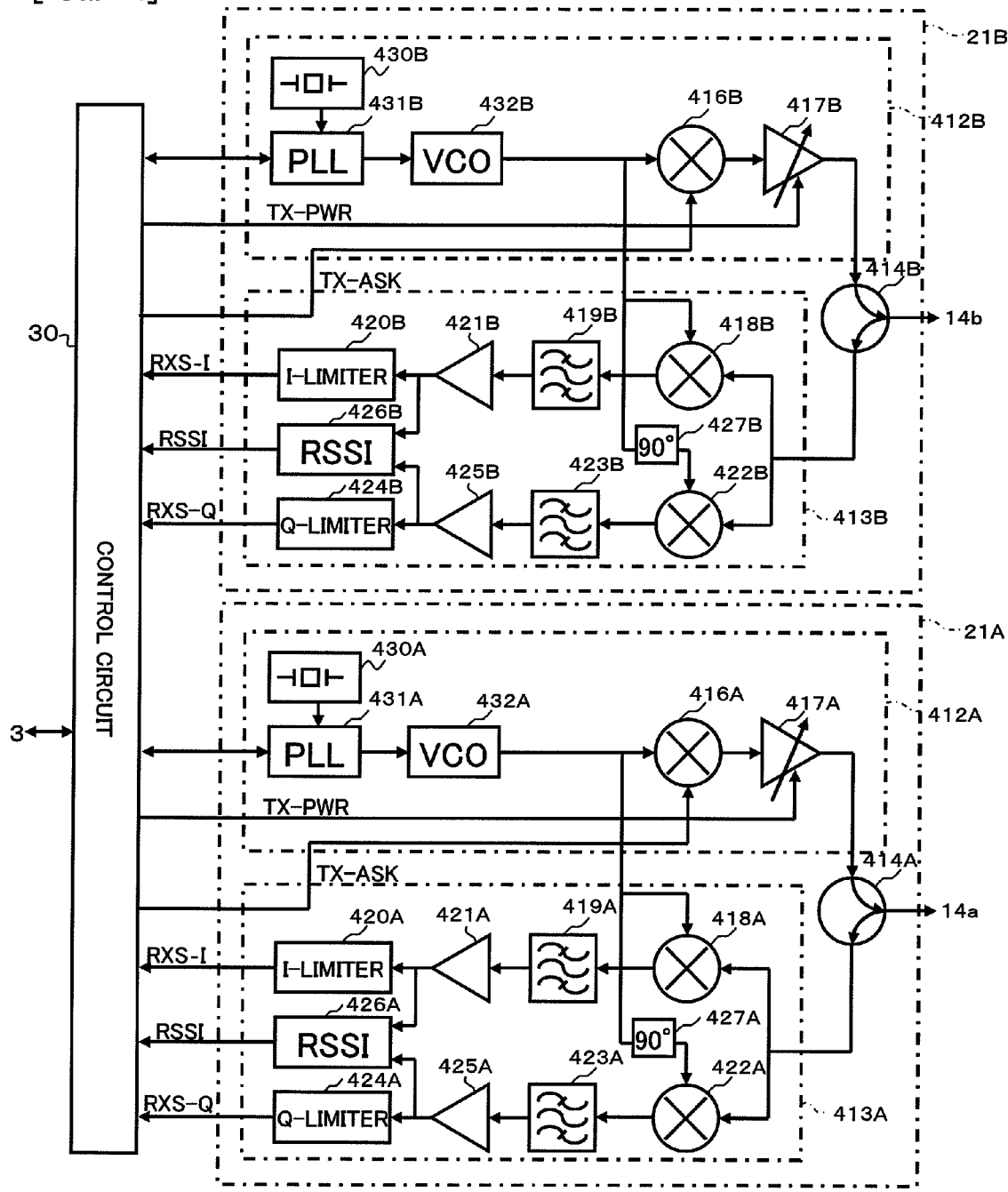

[FIG. 15]
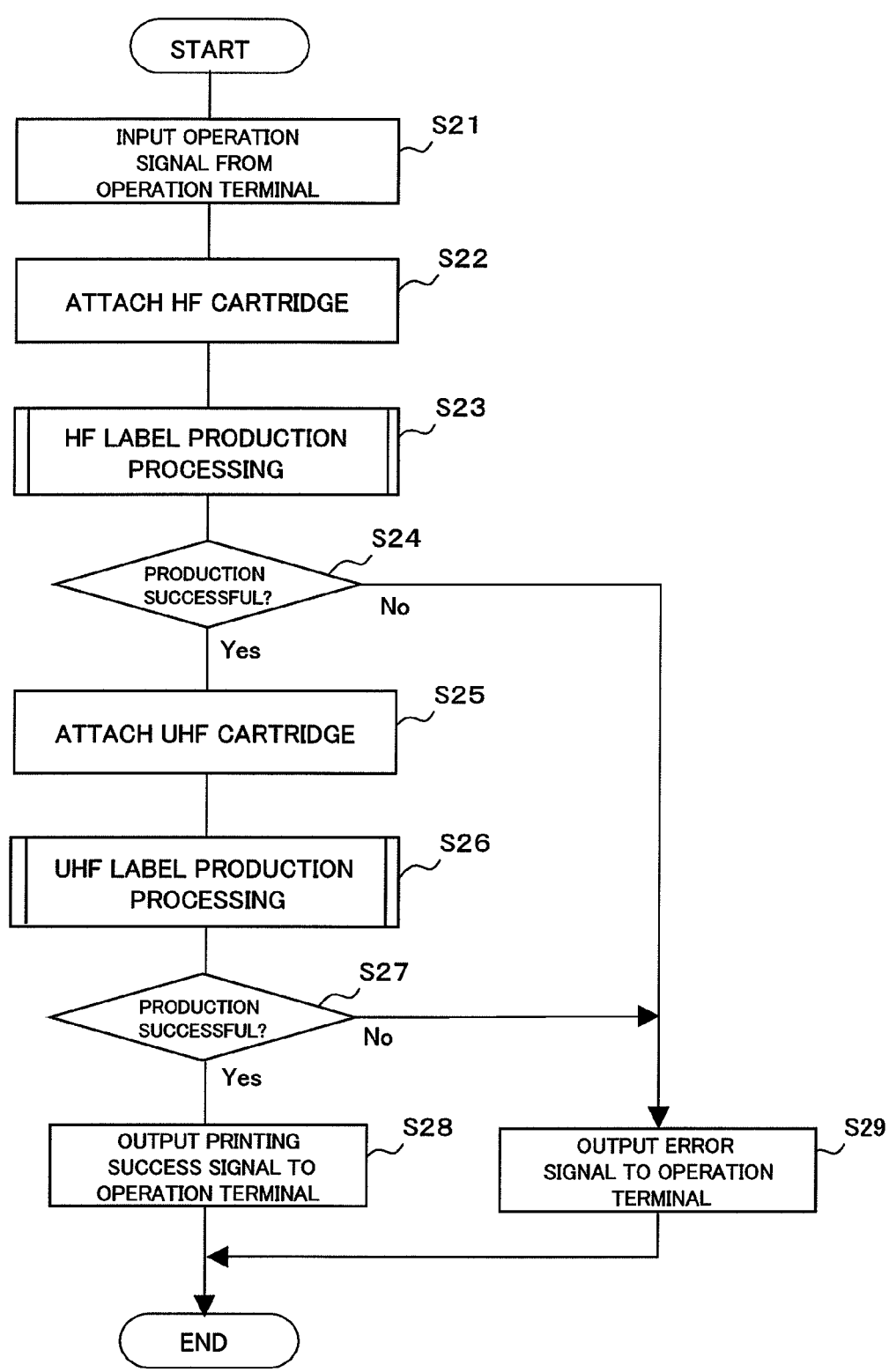

[FIG. 16]
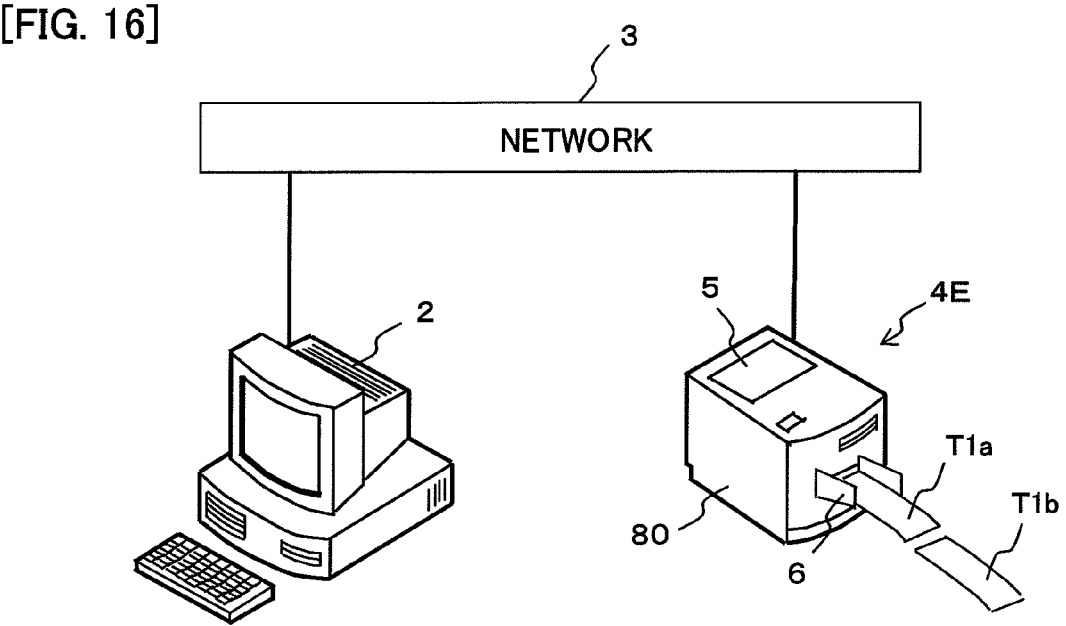
[FIG. 17]
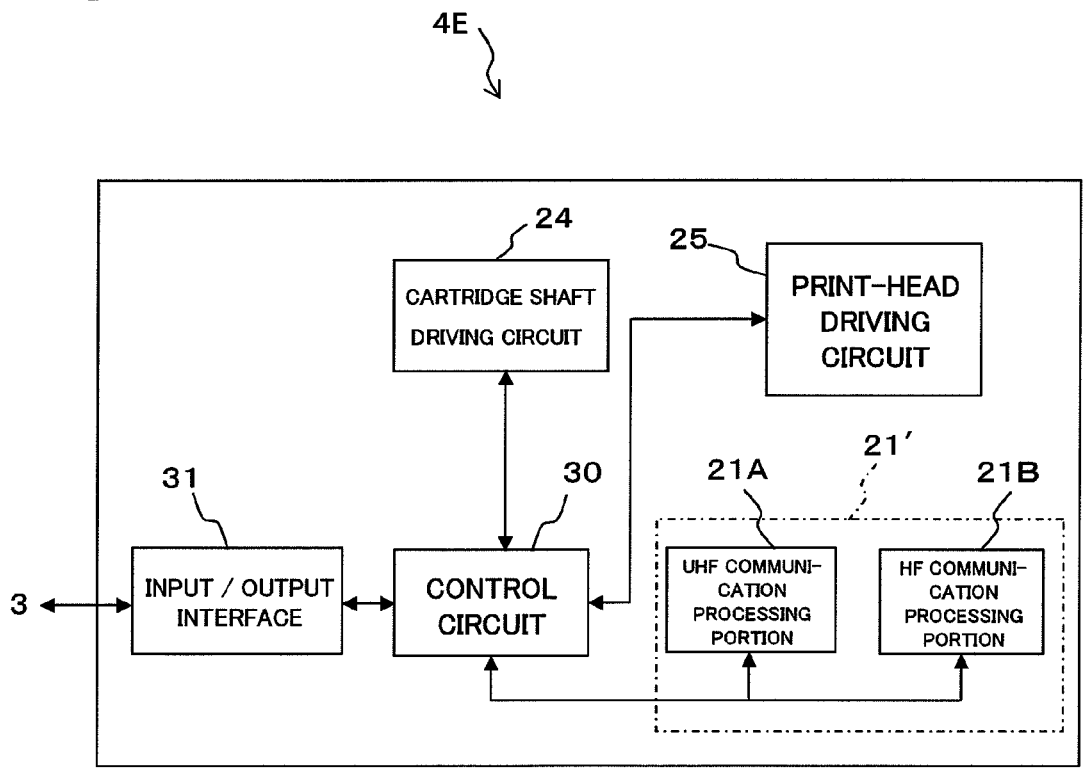

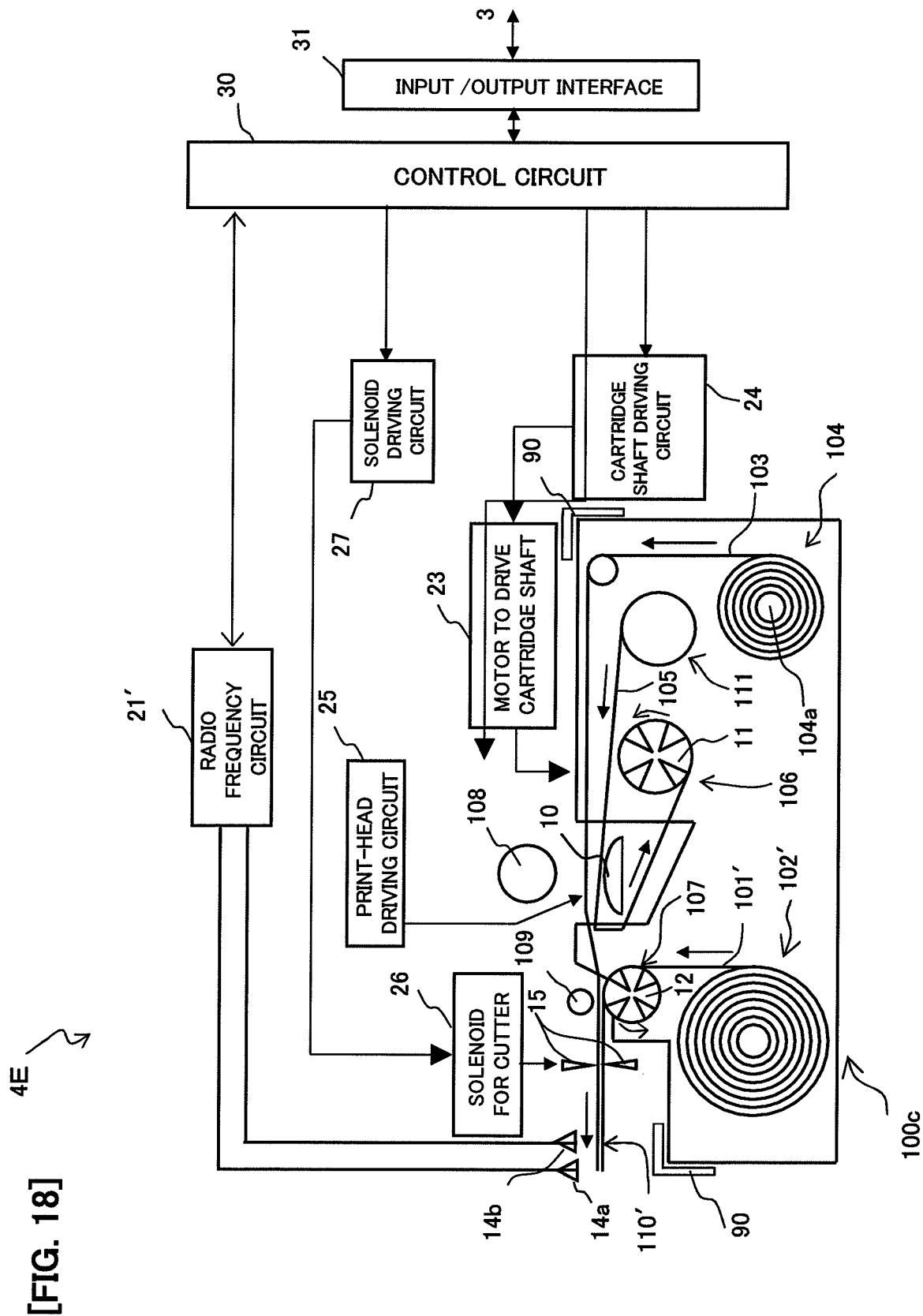
[FIG. 18]

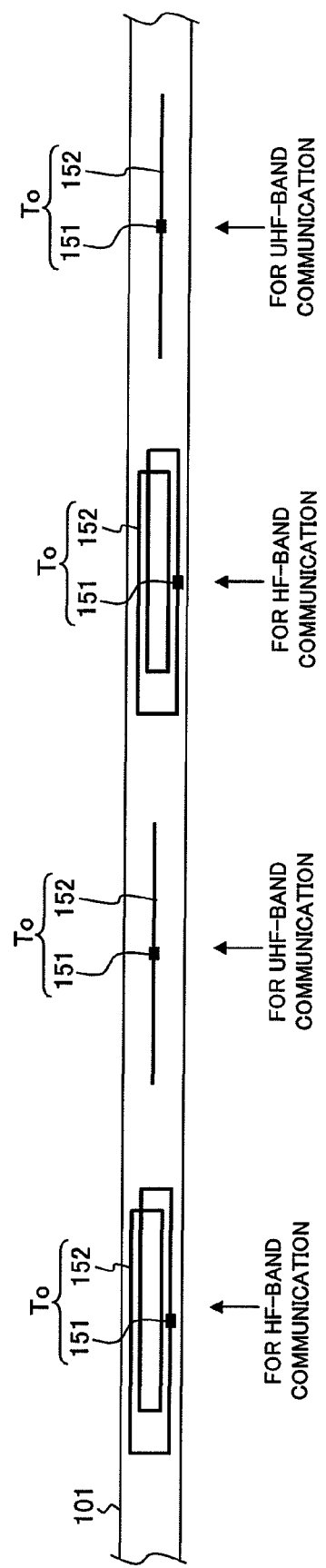
[FIG. 19]

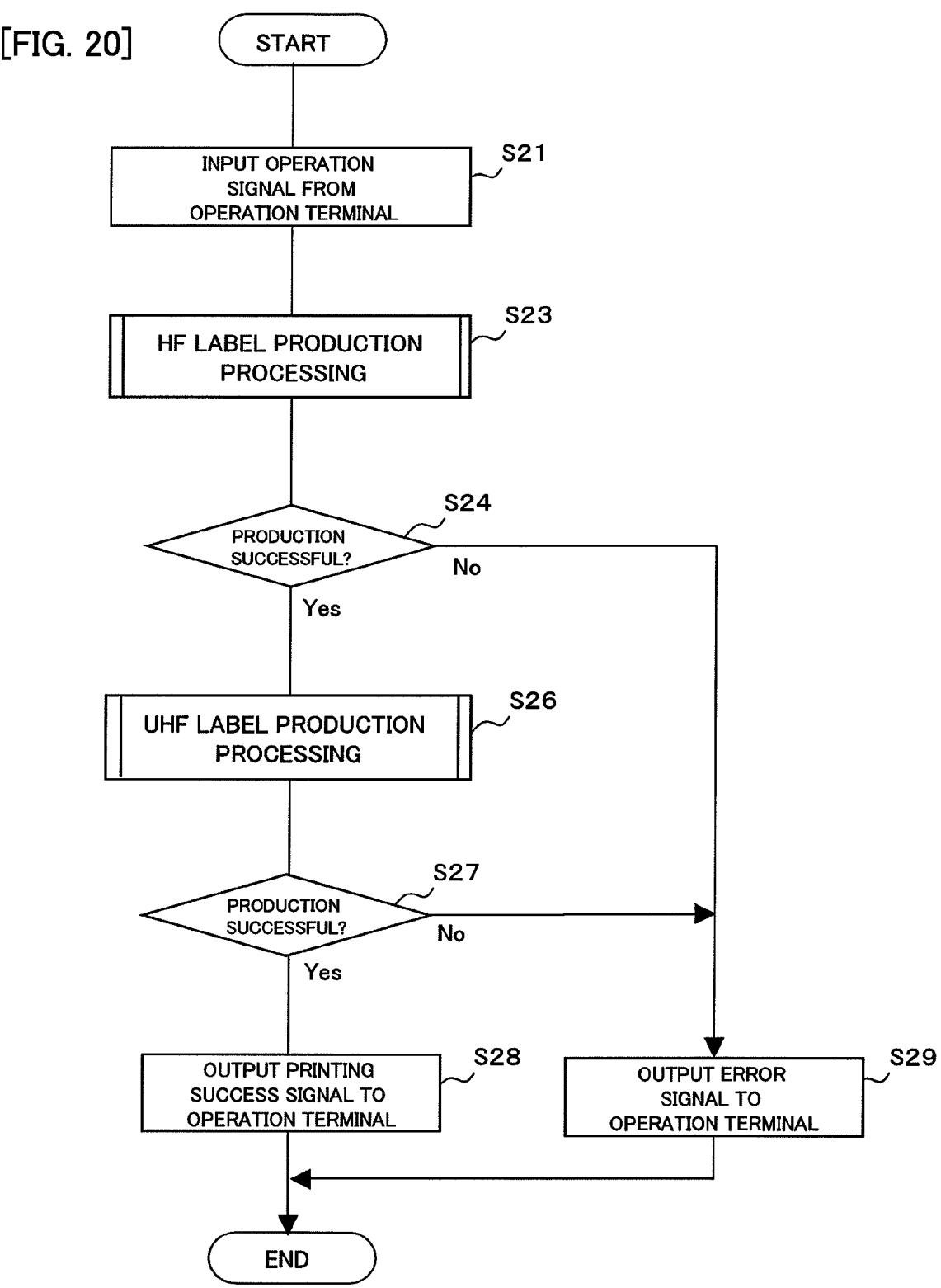
[FIG. 20]

APPARATUS FOR PRODUCING RFID LABELS, CARTRIDGE FOR INCLUDING AT LEAST A RFID TAG, AND RFID LABEL MANUFACTURING SYSTEM

CROSS-REFERENCE TO RELATED APPLICATIONS

This application claims priority from JP 2007-80092, filed Mar. 26, 2007, the contents of which are hereby incorporated by reference.

BACKGROUND OF THE INVENTION

1. Field of the Invention

The present invention relates to an apparatus for producing RFID labels configured to produce a RFID label provided with a RFID circuit element capable of transmission and reception of information with outside, a cartridge for including at least a RFID tag used for that, and a RFID label manufacturing system.

2. Description of the Related Art

A RFID (Radio Frequency Identification) system is already known in which a RFID label is provided on an article to be managed and information held therein is read contactlessly for article management.

In this system, the RFID circuit element provided at a RFID tag includes an IC circuit part storing predetermined RFID tag information and an antenna connected to the IC circuit part and transmitting/receiving information, and even if the RFID tag is stained or arranged in a hidden position, an access can be made from the side of the reader/writer to the RFID tag information of the IC circuit part (information reading/writing), and practical use in various fields has been widely promoted.

Examples of such a RFID tag include the one described in JP, A, 2000-339422, for example. In the RFID tag according to this related art, two sets of a RFID circuit element including an IC circuit part (semiconductor chip) storing information on an object and an antenna for information transmission and reception are provided, and operating frequencies of an antenna (the first antenna) of one of the RFID circuit elements and an antenna (the second antenna) of the other RFID circuit element are made different. By the arrangement, even if distances to the plurality of RFID tags are different from each other, for example, communication reliability can be improved.

SUMMARY OF THE INVENTION

If the above RFID tag is made into a label (RFID label) by providing a RFID circuit element on a label-state material, it can be easily affixed to any article to be classified and organized, which is very convenient.

However, in the above related art, to constitute the RFID tag as a tag label as above is not particularly considered. Thus, improvement of both communication reliability by plural frequency response and convenience by making into a label state has not been realized.

The present invention has an object to provide an apparatus for producing a RFID label capable of communication with high reliability, a cartridge for including at least a RFID tag, and a RFID label manufacturing system.

BRIEF DESCRIPTION OF THE DRAWING

FIG. 1 is a conceptual diagram illustrating a RFID label manufacturing system of a first embodiment of the present invention.

FIG. 2 is a conceptual block diagram illustrating a detailed structure of an apparatus for producing RFID labels.

FIG. 3 is a functional block diagram illustrating a detailed function of a radio frequency circuit.

FIG. 4 is a functional block diagram illustrating a functional configuration of a RFID circuit element provided at a RFID label.

FIG. 5 is a longitudinal sectional view illustrating a side sectional structure of the RFID label.

FIG. 6 is a flowchart illustrating a control procedure executed by an operation terminal at production of the RFID label.

FIG. 7 is a conceptual diagram illustrating a RFID label manufacturing system provided with an apparatus for producing RFID labels of a second embodiment of the present invention.

FIG. 8 is a schematic diagram illustrating outline configuration of the apparatus for producing RFID labels.

FIG. 9 is a conceptual block diagram illustrating a detailed structure of a label production processing portion provided at the apparatus for producing RFID labels.

FIG. 10 is a flowchart illustrating a control procedure executed by a central control portion at production of the RFID label by the apparatus for producing RFID labels in FIG. 7.

FIG. 11 is a conceptual diagram illustrating a RFID label manufacturing system provided with an apparatus for producing RFID labels in a third embodiment of the present invention.

FIG. 12 is a schematic diagram illustrating outline configuration of the apparatus for producing RFID labels.

FIG. 13 is a conceptual block diagram illustrating a detailed structure of the apparatus for producing RFID labels.

FIG. 14 is a functional block diagram illustrating a radio frequency circuit provided at the apparatus for producing RFID labels.

FIG. 15 is a flowchart illustrating a control procedure executed by a control circuit at production of the RFID label.

FIG. 16 is a conceptual diagram illustrating a RFID label manufacturing system provided with an apparatus for producing RFID labels in a fourth embodiment of the present invention.

FIG. 17 is a schematic diagram illustrating outline configuration of the apparatus for producing RFID labels.

FIG. 18 is a conceptual block diagram illustrating a detailed structure of the apparatus for producing RFID labels.

FIG. 19 is a conceptual plan view illustrating an arrangement configuration of the RFID circuit element in a base tape.

FIG. 20 is a flowchart illustrating a control procedure executed by a control circuit at production of the RFID label by the apparatus for producing RFID labels.

DETAILED DESCRIPTION OF THE PREFERRED EMBODIMENTS

An embodiment of the present invention will be described below referring to the attached drawings.

A first embodiment of the present invention will be described referring to FIGS. 1 to 6. This embodiment is an embodiment of a RFID label manufacturing system provided with a plurality of apparatuses for producing RFID label configured to produce a RFID label using a plurality of types of communication frequency different from each other.

FIG. 1 is a conceptual diagram illustrating the RFID label manufacturing system of this embodiment. This RFID label manufacturing system 1 includes an operation terminal 2 (command output device) such as a personal computer and a plurality of (two, in this example) apparatuses 4A, 4B for producing RFID labels connected to the operation terminal 2 through a communication network 3 (communication line).

An apparatus 4A for producing RFID labels (UHF-band label printer, an apparatus for producing RFID labels for ultrahigh frequency) is for producing a RFID label using a UHF-band communication frequency for information transmission and reception (hereinafter referred to as "UHF label" as appropriate) T1a. An apparatus 4B for producing RFID labels (HF-band label printer, an apparatus for producing RFID labels for high frequency) is for producing a RFID label using an HF-band communication frequency for information transmission and reception (hereinafter referred to as "HF label" as appropriate) T1b. On top faces of the apparatuses 4A, 4B for producing RFID labels, an opening/closing lid 5 is provided from/to which cartridges 100a, 100b (cartridge for including at least a RFID tag. See FIG. 2) accommodating a RFID circuit element To (See FIG. 5) used for production of the RFID labels T1a, T1b are taken out/placed in, while a discharge portion 6 from which the produced RFID labels T1a, T1b are taken out is provided on the front.

FIG. 2 is a conceptual block diagram illustrating a detailed structure of the apparatuses 4A, 4B for producing RFID labels provided at a RFID label manufacturing system of this embodiment.

The apparatuses 4A, 4B for producing RFID labels correspond to the RFID labels T1a, T1b to be produced and are different from each other in a point that the RFID circuit element To of a tag medium accommodated in the cartridges 100a, 100b is for UHF or for HF. They are also different in a point that tag access device that makes an access to the RFID circuit element To and transmits and receives information is an antenna 14a for UHF band (which will be described later) and a radio frequency circuit 21a (which will be described later) or an antenna 14b for HF band (which will be described later) and a radio frequency circuit 21b (which will be described later). Except those points, they are basically in the same structure and will be described using the same figure in common.

In FIG. 2, the cartridges 100a, 100b (hereinafter referred to as "cartridge 100" as appropriate) have a first roll 102 (actually, it is wound in a swirl state but shown concentrically in the figure for simplification) around which a base tape 101 (tag medium) in the band state is wound, a second roll 104 (actually, it is wound in a swirl state but shown concentrically in the figure for simplification) around which a transparent cover film 103 (print-receiving medium) having substantially the same width as that of the base tape 101 is wound, a ribbon-supply-side roll 111 that feeds out an ink ribbon 105, a ribbon take-up roller 106 for winding up the ribbon 105 after printing, a feeding roller 107 that feeds out the base tape 101 from the cartridge 100, presses and bonds the base tape 101 and the cover film 103 to have a tag label tape 110 with print (tag medium), while feeding the tape in a direction shown by an arrow.

On the base tape 101, the RFID labels To are disposed with a predetermined interval along a tape longitudinal direction. On the base tape 101 of the cartridge 100a used in the apparatus 4A for producing RFID labels, the RFID circuit element To for information transmission and reception at a communication frequency in the UHF band is provided, while on the base tape 101 of the cartridge 100b used in the apparatus 4B for producing RFID labels, the RFID circuit element To for information transmission and reception at a communication frequency in the HF band is provided.

A main body 80 includes a cartridge holder 90 (usual container installation holder) to which the cartridge 100 (usual RFID circuit element container) can be detachably attached, a print-head 10 (printing device) that makes a predetermined print (printing) on the cover film 103, a print-head driving circuit 25 that controls electricity to the print head 10, a ribbon take-up roller drive shaft 11 that drives the ribbon take-up roller 106, a feeding roller drive shaft (feeding device) 12 that drives the feeding roller 107, a motor 23 to drive cartridge shaft, which is a pulse motor, for example, that drives the feeding roller drive shaft 12 and the ribbon take-up roller drive shaft 11, a cartridge shaft driving circuit 24 that controls drive of the motor 23 to drive print cartridge shaft, the print-head driving circuit 25, a cutter 15 that produces an RFID label T with a predetermined length by sequentially cutting the tag label tape 110 with print at predetermined timing, a solenoid 26 for cutter that drives the cutter 15 and has the cutter perform a cutting operation, a solenoid driving circuit 27 that controls the solenoid 26, device antennas 14a, 14b that transmit/receive a signal to the RFID circuit element To provided at the cut tag label tape 110 with print (RFID label T) by radio communication using a radio frequency (UHF band or HF band as mentioned above) and write information (hereinafter simply referred to as "device antenna 14" or "antenna 14" as appropriate), radio frequency circuits 21a, 21b that generate a writing information signal to be written in the RFID circuit element To and make an access (for reading or writing) to the RFID circuit element To through the device antenna 14 (hereinafter simply referred to as "radio frequency circuit 21" as appropriate), and a control circuit 30 that controls operations of the entire apparatuses 4A, 4B for producing RFID labels (hereinafter simply referred to as "apparatus 4 for producing RFID labels" as appropriate). The antenna 14 and the radio frequency circuit 21 constitute a tag access device.

The antenna 14a of the apparatus 4A for producing RFID labels is an antenna corresponding to the UHF band communication (a dipole antenna, for example), while the antenna 14b of the apparatus 4B for producing RFID labels is an antenna corresponding to the HF band communication (loop-coil antenna, for example).

The control circuit 30 is a so-called microcomputer. Though not shown in detail, the control circuit 30 includes a CPU, which is a central processing device, a ROM, a RAM and the like, and performs signal processing according to a program stored in the ROM in advance using a temporary storage function provided by the RAM. Also, the control circuit 30 is connected to the network 3 via an input/output interface 31 and is capable of information exchange with the above-mentioned operation terminal 2 connected to this network 3.

In the above configuration, the ribbon take-up roller 106 and the feeding roller 107 are rotated and driven by a driving force of the motor 23 to drive cartridge shaft in a direction shown by an arrow, respectively, in synchronization with each other. At this time, the feeding roller drive shaft 12, a sub roll 109 and a platen roll 108 are connected via a gear (not shown), and the feeding roller 107, the sub roll 109, and the platen roll 108 are rotated with driving of the feeding roller drive shaft 12. As a result, the base tape 101 in a four-layer structure (which will be described later) is fed out of the first roll 102 and supplied to the feeding roller 107, while the cover film 103 is fed out of the second roll 104.

The fed-out cover film 103 is sandwiched between the print head 10 and the platen roll 108 together with the ribbon 105 driven by the ribbon supply-side roll 111 and the ribbon take-up roller 106 arranged on its back face side (that is, the side to be affixed to the base tape 101) and pressed by the print head 10 so as to be brought into contact with the back face of the cover film 103. At this time, a plurality of heating elements of the print head 10 is electrified by the print head driving circuit 25, and a print R (See FIG. 5, which will be described later) such as characters and symbols is printed on a predetermined region on the back face of the cover film 103. The ink ribbon 105 having finished print on the cover film 103 is taken up by the ribbon take-up roller 106 by the driving of the ribbon take-up roller drive shaft 11.

The cover film 103 after print is sandwiched between the feeding roller 107 and the sub roll 109 together with the base tape 101 and as a result, they are bonded and integrated to be formed as the tag label tape 110 with print.

With the above configuration, the apparatuses 4A, 4B for producing RFID labels form the tag label tape 110 with print by printing the print R on the cover film 103 and bonding the cover film 103 and the base tape 101 together. Then, information is transmitted/received with the RFID circuit element To provided at the tag label tape 110 with print by a radio frequency in the UHF band, HF band through the device antennas 14a, 14b, respectively so as to write information having substantially the same contents (common to the apparatus 4A for producing RFID labels and the apparatus 4B for producing RFID labels) in the IC circuit part 151 in the RFID circuit element To, and then, the tag label tape 110 with print is cut to a predetermined length. By this operation, the apparatus 4A for producing RFID labels produces the RFID label T1a for the UHF band (UHF label), while the apparatus 4B for producing RFID labels produces the RFID label T1b for the HF band (HF label).

FIG. 3 is a functional block diagram illustrating detailed functions of the radio frequency circuits 21a, 21b. In FIG. 3, the radio frequency circuit 21 includes a transmitting portion 32 that transmits a signal to the RFID circuit element To through the antenna 14, a receiving portion 33 for receiving reflected waves from the RFID circuit element To received by the antenna 14, and a transmit-receive splitter 34.

The transmitting portion 32 has a crystal oscillator 35, a PLL (Phase Locked Loop) 36, and a VCO (Voltage Controlled Oscillator) 37, that generate a carrier wave (radio frequency in the UHF band or HF band) for accessing (reading or writing) the RFID tag information stored in the IC circuit part 151 of the RFID circuit element To according to a control signal (carrier-wave generation command signal) from the control circuit 30, a transmission multiplying circuit 38 (however, it may be replaced by an amplitude factor variable amplifier or the like in the case of amplitude modulation) for modulating (in this example, amplitude modulation based on the "TX_ASK" signal supplied from the signal processing circuit 22) the carrier wave generated as described above based on a signal supplied from the signal processing circuit 22, and a variable transmission amplifier 39 that amplifies the modulated waves modulated by the transmission multiplying circuit 38 with an amplification factor determined according to a "TX_PWR" signal supplied from the control circuit 30. The carrier wave generated as above preferably uses a frequency in the UHF band (ultrahigh frequency at 2.45 GHz, for example) in the radio frequency circuit 21a in the apparatus 4A for producing RFID labels and uses a frequency in the HF band in the radio frequency circuit 21b in the apparatus 4B for producing RFID labels (high frequency at 13.56 MHz, for example). The output from the transmission amplifier 39 is transmitted to the antenna 14 through the transmit-receive splitter 34 and is supplied to the RFID circuit element To. The RFID tag information is not limited to the modulated signal as above but might be only a carrier wave.

The receiving portion 33 includes an I-phase receiving signal multiplying circuit 40 that multiplies the reflected wave from the RFID circuit element To received through the antenna 14 by the carrier wave generated as described above for demodulation, an I-phase bandpass filter 41 that extracts only the signals within the necessary frequency band from the output of the I-phase receiving signal multiplying circuit 40, an I-phase receiving signal amplifier 43 that amplifies the output of the I-phase bandpass filter 41, an I-phase limiter 42 that further amplifies the output of the I-phase receiving signal amplifier 43 and converts it to a digital signal, a Q-phase receiving signal multiplying circuit 44 that multiplies the reflected wave from the RFID circuit element To received through the antenna 14 by the carrier wave whose phase has been delayed by a phase shifter 49 by 90° after having been generated as described above, a Q-phase bandpass filter 45 that extracts only the signals within the necessary frequency band from the output of the Q-phase receiving signal multiplying circuit 44, a Q-phase receiving signal amplifier 47 that amplifies the output of the Q-phase bandpass filter 45, and a Q-phase limiter 46 that further amplifies the output of the Q-phase receiving signal amplifier 47 and converts it to a digital signal. The signal "RXS-I" output from the I-phase limiter 42 and the signal "RXS-Q" output from the Q-phase limiter 46 are input to the signal processing circuit 22 for processing. The outputs from the I-phase receiving signal amplifier 43 and the Q-phase receiving signal amplifier 47 are also input to an RSSI (Received Signal Strength Indicator) circuit 48, and the signal "RSSI" indicating the intensity of these signals is input to the signal processing circuit 22.

FIG. 4 is a functional block diagram illustrating a functional configuration of the RFID circuit element. In FIG. 4, the RFID circuit element To has an antenna 152 for transmission and reception of a signal contactlessly with the antenna 14 on the side of the apparatus 4 for producing RFID labels using the predetermined radio frequency (UHF band or HF band) and the IC circuit part 151 connected to the antenna 152.

As for the antenna 152, a dipole antenna is used (corresponding to a communication frequency of the UHF band) in the RFID circuit element To provided at the base tape 101 in the cartridge 100a attached to the apparatus 4A for producing RFID labels. A loop coil antenna is used (corresponding to a communication frequency in the HF band) in the RFID circuit element To provided at the base tape 101 in the cartridge 100b attached to the apparatus 4B for producing RFID labels.

The IC circuit part 151 includes a rectification part 153 that rectifies a carrier wave received by the antenna 152, a power source part 154 that accumulates energy of the carrier wave rectified by the rectification part 153 to make it a driving power source of the IC circuit part 151, a clock extraction part 156 that extracts a clock signal from the carrier wave received by the antenna 152 and supplies it to a control part 155, a memory part 157 that can store a predetermined information signal, a modem part 158 connected to the antenna 152, and the control part 155 that controls operations of the RFID circuit element To through the rectification part 153, the clock extraction part 156, the modem part 158 and the like.

The modem part 158 demodulates a communication signal from the antenna 14 of the apparatus 7' for producing RFID labels received by the antenna 152 and modulates the carrier wave received by the antenna 152 based on a reply signal from the control part 155 and re-sends it as a reflected wave from the antenna 152.

The control part 155 executes basic control such as control of interpreting the receiving signal demodulated by the modem part 158, generating a reply signal based on the information signal stored in the memory part 157, replying by the modem part 158 and the like.

The clock extraction part 156 extracts a clock component from the received signal into the control part 155 and supplies the clock corresponding to a speed of the clock component of the received signal to the control part 155.

FIG. 5 is a longitudinal sectional view illustrating a side sectional structure of the RFID labels T1a, T1b produced by the apparatuses 4A, 4B for producing RFID labels.

In FIG. 5, the RFID labels T1a, T1b (hereinafter simply referred to as the "RFID label T" as appropriate) are in the five-layered structure (=the same structure as that of the tag label tape 110 with print) in which the base tape 101 in the four-layered structure is bonded to the back face of the cover film 103, constructed in lamination in the order of an adhesive layer 101a, a colored base film 101b made of PET (polyethylene terephthalate), an adhesive layer 101c provided with an adhesive for affixing an object to be affixed, and a separation sheet 101d covering the affixing side of the adhesive layer 101c from the side of the cover film 103 (upper side in FIG. 5) to the opposite side. By this structure, when the RFID label T is finally affixed to an object to be affixed, it can be bonded to the object by the adhesive layer 101c by peeling off the separation sheet 101d.

In the adhesive layer 101c, the RFID circuit element To made of the IC circuit part 151 and the antenna 152 (the antenna 152 in FIG. 5 schematically shows a dipole antenna provided at the RFID label T1a) is formed, and in the IC circuit part 151, information is written by communication with the antenna 14 on the side of the apparatus 4 for producing RFID labels. The information writing is executed by transmission and reception of information by the communication frequency in the UHF band in the UHF label T1a produced by the apparatus 4A for producing RFID labels and by transmission and reception of information by the communication frequency in the HF band in the HF label T1b produced by the apparatus 4B for producing RFID labels, as mentioned above.

On a portion corresponding to the RFID circuit element To on the back face of the cover film 103, the print R such as characters and symbols corresponding to the written-in information is printed.

FIG. 6 is a flowchart illustrating a control procedure executed by a control circuit of the operation terminal 2 at production of the RFID label by the RFID label manufacturing system 1 of this embodiment. This flow is started when the operation terminal 2 is operated.

First, at Step S1, an operation signal of an operator is input through an operating device such as a keyboard. This operation signal includes a tag label production command for producing the RFID label T, printing data to be printed on the RFID label T, and communication data to be written in the RFID circuit element To. In this embodiment, when the RFID label T is to be produced, as mentioned above, both the UHF label T1a and the HF label T1b (in which substantially the same information is written in the respective RFID circuit elements To) are basically produced in a lump sum at the same time (plural-type label production processing mode), but a mode for producing only the UHF label T1a or the HF label T1b (an UHF label production mode or an HF label production mode as a single-type label production processing mode) is also prepared in advance. The operation signal also includes mode selection information (identifier) on which of these three modes is selected.

After that, at Step S2, based on the mode selection information included in the operation signal input at Step S1, it is determined whether or not the UHF label T1a and the HF label T1b are both produced at the same time (function corresponding to the mode switching portion described in each claim). If the plural-type label production processing mode has been selected, the determination is satisfied, and the routine goes to Step S3. If the plural-type label production processing mode has not been selected, the determination is not satisfied and the routine goes to Step S5.

At Step S3, a RFID label production instruction signal is output to the apparatus 4A for producing RFID labels through the network 3. By this operation, the apparatus 4A for producing RFID labels operates as above based on the RFID label production instruction signal from the operation terminal 2 so as to produce the UHF label T1a.

After that, at Step S4, the RFID label production instruction signal is output to the apparatus 4B for producing RFID labels through the network 3. By this operation, the apparatus 4B for producing RFID labels operates as above based on the RFID label production instruction signal from the operation terminal 2 so as to produce the HF label T1b. The order of Step S3 and Step S4 is switchable.

On the other hand, at Step S5, based on the mode selection information included in the operation signal input at step S1, it is determined whether or not the UHF label T1a is to be produced. If the UHF label production mode has been selected, the determination is satisfied and the routine goes to Step S6, while if the UHF label production mode has not been selected (=if the HF label production mode has been selected), the determination is not satisfied and the routine goes to Step S7.

At Step S6, similarly to Step S3, the RFID label production instruction signal is output to the apparatus 4A for producing RFID labels through the network 3 so as to produce the UHF label T1a.

At Step S7, similarly to Step S4, the RFID label production instruction signal is output to the apparatus 4B for producing RFID labels through the network 3 so as to produce the HF label T1b.

When Step S4 or Step S6 or step S7 is completed, this flow is finished.

As mentioned above, in the RFID label manufacturing system 1 of this embodiment, the apparatuses 4A, 4B for producing RFID labels feed the base tape 101, respectively, according to the RFID label production command included in the operation signal output from the operation terminal 2 and perform information writing of substantially the same contents through information transmission and reception at different communication frequencies (UHF band or HF band in this example) to each of the RFID circuit elements To so that the RFID labels T1a (UHF label in this example), T1b (HF label in this example) of the types different from each other are produced in a lump sum.

That is, with the RFID label production command by a single operation of the operation terminal 2, the RFID labels T1a, T1b having substantially the same information and the communication frequencies (UHF band, HF band) different from each other can be produced at the same time. By this operation, a plurality of types of communication frequencies (ultrahigh frequency and high frequency in this example) with the respective advantages and disadvantages are used at the same time and the disadvantages of the communication frequencies can be compensated by each other (the advantages of the high frequency and ultrahigh frequency can be utilized while compensating for the respective disadvantages in this example), and the RFID label capable of highly reliable information communication can be produced.

A second embodiment of the present invention will be described referring to FIGS. 7 to 10. This embodiment is an embodiment when both the UHF label production function and the HF label production function are built in a single apparatus for producing RFID labels. The same reference numerals and symbols are given to the portions equivalent to those in the first embodiment, and the description will be omitted or simplified as appropriate.

FIG. 7 is a conceptual diagram illustrating the RFID label manufacturing system 1 provided with an apparatus 4C for producing RFID labels of this embodiment and corresponds to FIG. 1 in the first embodiment. FIG. 8 is a schematic diagram illustrating an outline configuration of the apparatus 4C for producing RFID labels.

In FIGS. 7 and 8, the apparatus 4C for producing RFID labels of this embodiment has two label production processing portions, that is, an UHF label production processing portion 7a that produces the UHF label T1a and an HF label production processing portion 7b that produces the HF label T1b. As the details will be described later, the UHF label production processing portion 7a is provided with a function equivalent to that of the apparatus 4A for producing RFID labels in the first embodiment, while the HF label production processing portion 7b is provided with a function equivalent to that of the apparatus 4B for producing RFID labels in the first embodiment. As a result, the embodiment is configured to be provided with the two apparatuses 4A, 4B for producing RFID labels in the single apparatus 4C.

On the upper face of the apparatus 4C for producing RFID labels, the opening/closing lids 5 are provided, respectively, particularly for taking the cartridge 100a (UHF cartridge) accommodating the RFID circuit element To for UHF band and the cartridge 100b (HF cartridge) accommodating the RFID circuit element To for HF band in/out of the main body 80, and on the side face of the apparatus 4C for producing RFID labels, the discharge portions 6 are provided, respectively, particularly for discharging the produced UHF label T1a and the HF label T1b.

Also, in the apparatus 4C for producing RFID labels, a common central control portion 28 that controls each of the label production processing portions 7a, 7b is provided. This central control portion 28 is connected to the network 3 through the input/output interface 31, by which the apparatus 4C for producing RFID labels is connected to the operation terminal 2 such as a personal computer as mentioned above through the network 3.

FIG. 9 is a conceptual block diagram illustrating a detailed structure of the label production processing portions 7a, 7b provided at the apparatus 4C for producing RFID labels of this embodiment.

In FIG. 9, the label production processing portions 7a, 7b have configuration substantially equivalent to the detailed structure of the respective apparatuses 4A, 4B for producing RFID labels in the first embodiment described referring to FIG. 2.

That is, the label production processing portions 7a, 7b (hereinafter simply referred to as "label production processing portion 7" as appropriate) has the feeding roller drive shaft 12 (individual feeding device, feeding device) that feeds the base tape 101, the antenna 14a for information transmission and reception to the RFID circuit element To of the base tape 101 and the radio frequency circuit 21a (individual tag access device, tag access device) or the antenna 14b and the radio frequency circuit 21b (individual tag access device, tag access device). Also, the label production processing portion 7 has the cartridge holder 90 (usual container installation holder) to which the cartridge 100 (usual RFID circuit element container) can be detachably attached, and the print head 10 (individual printing device, printing device) that makes a predetermined print on the cover film 103 (if the base tape 101 and the cover film 103 are not bonded as the tag medium, the print is made on the base tape itself. See the following for detail).

That is, in the respective label production processing portions 7a, 7b, similarly to the above, the print R is made on the cover film 103, and the cover film 103 and the base tape 101 are bonded together so as to form the tag label tape 110 with print. Then, through information transmission and reception with the RFID circuit element To provided at the tag label tape 110 with print at a radio frequency in the UHF band, HF band through the device antennas 14a, 14b, respectively, information having substantially the same contents (the same in the label production processing portion 7a and the label production processing portion 7b) is written in the IC circuit part 151 of the RFID circuit element To and then, the tag label tape 110 with print is cut to a predetermined length. By this operation, the RFID label T1a for UHF band (UHF label) is produced by the label production processing portion 7a and the RFID label T1b for HF band (HF label) is produced by the label production processing portion 7b.

FIG. 10 is a flowchart illustrating a control procedure executed by the central control portion 28 at production of the RFID label by the apparatus 4C for producing RFID labels of this embodiment. This flow is started when the apparatus 4C for producing RFID labels is operated.

First, at Step S11, through the input/output interface 31, similarly to Step S1 in FIG. 6 of the first embodiment, an operation signal of an operator is input through the operating device such as a keyboard of the operation terminal 2 (command input portion). This operation signal includes a tag label production command for producing the RFID label T, printing data to be printed on the RFID label T, and communication data to be written in the RFID circuit element To. In this embodiment, when the RFID label T is to be produced, unlike the first embodiment, both the UHF label T1a and the HF label T1b are produced in a lump sum at the same time (the function equivalent to that of the plural-type label production processing mode is executed all the time). However, by providing the function similar to that of Step S2 in the flow of FIG. 6 (=mode switching portion), the UHF label production mode and the HF label production mode may be made executable. In this case, according to the operation on the operator side, production of the RFID label T with plural frequencies (plural-type label production processing mode) and production of the RFID label T with single frequency (the UHF label production mode or HF label production-mode as the single-type label production processing mode) can be switched. Therefore, since only the single type of RFID label (UHF label or HF label in this example) corresponding to the single type of communication frequency can be produced (as conventionally) as needed, a range of use modes is expanded and convenience can be further improved.

After that, the routine goes to Step S12, where an instruction signal for executing the RFID label production processing is output to the HF label production processing portion 7b (or in more detail, the control circuit 30). As a result, the HF label production processing portion 7b operates as above based on the RFID label production instruction signal and executes the production processing of the HF label T1b (at this time, since the HF label T1b and the UHF label T1a use tag IDs different from each other, an inquiry signal is output to the HF label T1b so as to read the tag ID, and the RFID circuit element To be written is identified by the read-out tag ID and the information writing is performed). At this time, if the production of the HF label is successfully finished (without any communication error or the like), the label production processing portion 7b outputs a signal indicating the fact (label production completion notification) to the central control portion 28, and at the next Step S13, it is determined if the label production completion notification has been input (in other words, the production of the HF label T1b has been successful).

If the HF label production has been successful, the determination at Step S13 is satisfied, and the routine goes to Step S14A. If the HF label production has not been successful (failure), the determination is not satisfied and the routine goes to Step S14B.

At Step S14A, an instruction signal for executing the RFID label production processing is output to the UHF label production processing portion 7a (or in more detail, the control circuit 30). As a result, the UHF label production processing portion 7a operates as above based on the RFID label production instruction signal and executes the production of the UHF label T1a (as described above, an inquiry signal is output to the UHF label T1a so as to read the tag ID, and the RFID circuit element To be written is identified by the read-out tag ID and the information writing is performed). At this time, if the production of the UHF label is successfully finished (without any communication error or the like), the label production processing portion 7a also outputs a signal indicating the fact (label production completion notification) to the central control portion 28 as above, and at the next Step S15A, it is determined if the label production completion notification has been input (in other words, the production of the UHF label T1a has been successful).

If the UHF label production has been successful, the determination at Step S15A is satisfied, and the routine goes to Step S16A. If the UHF label production has not been successful (failure), the determination is not satisfied and the routine goes to Step S17A.

At Step S16A, according to success of the HF label production at Step S13 and success of the UHF label production at Step S15A, a report signal (including the tag IDs of both labels) indicating that label production was successful both for the HF label and the UHF is transmitted to the operation terminal 2 through the input/output interface 31 and the network 3. By this operation, corresponding production completion display is made by appropriate display device, for example, at the operation terminal 2 so that the fact that both the HF label T1b and the UHF label T1a have been produced in a lump sum at the same time can be reported to the operator. Also, at Step S17A, according to success of the HF label production at Step S13 and failure of the UHF label production at Step S15A, a report signal (including the tag ID) indicating that label production was successful only for the HF label is transmitted to the operation terminal 2 through the input/output interface 31 and the network 3. By this operation, corresponding display is made by appropriate display device, for example, at the operation terminal 2 so that the fact that the HF label T1b has been produced but the production of the UHF label T1a has failed can be reported to the operator.

On the other hand, at Step S14B, an instruction signal for executing the RFID label production processing is output to the UHF label production processing portion 7a (or in more detail, the control circuit 30) similarly to Step S14A. As a result, the UHF label production processing portion 7a operates as above based on the RFID label production instruction signal and executes the production of the UHF label T1a (as described above, an inquiry signal is output to the UHF label T1a so as to read the tag ID, and the RFID circuit element To be written is identified by the read-out tag ID and the information writing is performed as above). After that, similarly to Step S15A, it is determined if the label production completion notification has been input (in other words, the production of the UHF label T1a has been successful) at the next Step S15B.

If the UHF label production has been successful, the determination at Step S15B is satisfied, and the routine goes to Step S16B. If the UHF label production has not been successful, the determination is not satisfied, and the routine goes to Step S17B.

At Step S16B, similarly to Step S16A, according to failure of the HF label production at Step S13 and success of the UHF label production at Step S15B, a report signal (including the tag ID) indicating that label production was successful only for the UHF label is transmitted to the operation terminal 2 through the input/output interface 31 and the network 3. By this operation, corresponding display is made by appropriate display device, for example, at the operation terminal 2 so that the fact that the HF label T1b production has failed but the UHF label T1a production has been successful can be reported to the operator. Also, at Step S17B, similarly to Step S17A, according to failure of the HF label production at Step S13 and failure of the UHF label production at Step S15B, an error signal is transmitted to the operation terminal 2 through the input/output interface 31 and the network 3. By this operation, corresponding error display is made by appropriate display device, for example, at the operation terminal 2 so that the fact that production of both the HF label T1b and the UHF label T1a has failed is reported to the operator.

When Step S16A, Step S16B, Step S17A, and Step S17B have been completed, the routine is finished. In the above, the order of the HF label production processing at Step S12→the UHF label production processing at Step S14A or Step S14B was employed, but it may be the order of the UHF label production processing→the HF label production processing to the contrary.

In the above, Step S12, Step S14A, and Step S14B constitute a coordination control portion to control the feeding device and the tag access device in coordination with each other so that when the RFID label production command is input with the command input portion, the plural types of the RFID labels corresponding to the command are produced in a lump sum using the plural types of the RFID circuit elements, respectively, as described in each claim.

As described above, in the apparatus 4C for producing RFID labels in the second embodiment of the present invention, the central control portion 28 controls each of the label production processing portions 7a, 7b according to the RFID label production command included in the operation signal output from the operation terminal 2. By this operation, at each of the label production processing portions 7a, 7b, the base tape 101 is fed, respectively, and information writing of substantially the same contents through information transmission and reception at different communication frequencies (UHF band or HF band in this example) to the RFID circuit elements To so that the RFID labels T1a (UHF label in this example), T1b (HF label in this example) of the types different from each other are produced in a lump sum.

That is, with the RFID label production command by a single operation of the operation terminal 2, the RFID labels T1a, T1b having substantially the same information and the communication frequencies (UHF band, HF band) different from each other can be produced at the same time similarly to the first embodiment. By this operation, a plurality of types of communication frequencies (ultrahigh frequency and high frequency in this example) with the respective advantages and disadvantages is used at the same time and the disadvantages of the communication frequencies can be compensated by each other (the advantages of the high frequency and ultrahigh frequency can be utilized while compensating for the respective disadvantages in this example), and the RFID label capable of highly reliable information communication can be surely produced.

A third embodiment of the present invention will be described referring to FIGS. 11 to 15. This embodiment is an embodiment when apparatus configuration is simplified by switchingly attaching the cartridge. The same reference numerals and symbols are given to portions equivalent to those in the first and second embodiments, and the description will be omitted or simplified as appropriate.

FIG. 11 is a conceptual diagram illustrating the RFID label manufacturing system 1 provided with an apparatus 4D for producing RFID labels of this embodiment and corresponds to FIG. 7 in the second embodiment. FIG. 12 is a schematic diagram illustrating an outline configuration of the apparatus 4D for producing RFID labels.

In FIGS. 11 and 12, the apparatus 4D for producing RFID labels of this embodiment selectively attaches the cartridge 100a for producing UHF label (UHF cartridge) and the cartridge 100b for producing HF label (HF cartridge) in a single apparatus, capable of switching.

The central control portion 28 in the second embodiment is omitted, the control circuit 30 is connected to the input/output interface 31, by which the apparatus 4D for producing RFID labels is connected to the operation terminal 2 such as a personal computer through the network 3. To the input/output interface 31, a cartridge control portion 29, which is newly provided for driving control (the detail will be described later) at cartridge switching is connected. Moreover, to the input/output interface 31, the cartridge shaft driving circuit 24, the print head driving circuit 25, a radio frequency circuit 21' provided instead of the radio frequency circuit 21 and the like are connected. The radio frequency circuit 21' is provided with an UHF communication processing portion 21A and an HF communication processing portion 21B (the detail will be described later).

On the upper face of the apparatus 4D for producing RFID labels, the opening/closing lids 5 are provided for taking the UHF cartridge 100a and the UHF cartridge 100b in/out of the main body 80. On the front face of the apparatus 4D for producing RFID labels, the common discharge portion 6 for discharging the produced UHF label T1a and the HF label T1b is provided.

FIG. 13 is a conceptual block diagram illustrating a detailed structure of the apparatus 4D for producing RFID labels of this embodiment.

In FIG. 13, the apparatus 4D for producing RFID labels of this embodiment has the feeding roller drive shaft (common feeding device, feeding device) 12 that feeds the base tape 101, the print head 10 (common printing device, printing device) that makes a predetermined print on the cover film 103, the antenna 14a (for UHF band communication) and the antenna 14b (for HF band communication) for information transmission and reception with the RFID circuit element To on the base tape 101, and the radio frequency circuit 21'.

As a distinctive characteristic of this embodiment, the apparatus 4D for producing RFID labels has a cartridge switch 81 (container installation device) that selectively extracts the cartridges 10a (corresponding to UHF band communication), 100b (corresponding to HF band communication) accommodating the base tapes 101, respectively and sets it at a feeding capable position (that is, the cartridge holder 90) by the feeding roller drive shaft 12.

The cartridge switch 81 is provided with a cartridge switching arm 82 and a motor 83 that generates a driving force for operating the switching arm 82. Based on a control signal of the control circuit 30, a motor driving circuit 94 is controlled by the cartridge switching control portion 29.

As mentioned above, to the cartridge holder 90, either of the UHF cartridge 100a and the HF cartridge 100b can be attached. In the vicinity of the cartridge holder 90, a standby holder 91 is provided in which the cartridges 100a, 100b waiting to be attached are stored. Based on the driving signal from the motor driving circuit 94, the cartridge switching arm 82 is driven by the driving force of the motor 83, and thereby the cartridges are switched. That is, the cartridge 100 attached to the standby holder 91 is taken out, fed and attached to the cartridge holder 90, or to the contrary, the cartridge 100 attached to the cartridge holder 90 is taken out, fed to the standby holder 91 and temporarily stored therein.

That is, in the apparatus 4D for producing RFID labels in this embodiment, the plurality of cartridges 100 in the standby holder 91 are selected and extracted by the cartridge switch 81 and set at the cartridge holder 90. The cover film 103 and the base tape 101 in the cartridge 100a (or 100b) set as above are fed by the driving force of the feeding roller drive shaft 12. Then, similarly to the first and second embodiments, the print R is made by the print head 10 on the cover film 103, and moreover, the base tape 101 is bonded so as to form the tag label tape 110 with print. Then, through the RFID circuit element To provided at the tag label tape 110 with print (base tape 101) and the antenna 14a for UHF band communication (or antenna 14B for HF band communication) provided on the downstream side in the feeding direction (of the common feeding path) than the print head 10, information is transmitted and received by a radio frequency in the UHF band (or HF band). By this information transmission and reception, information with substantially the same contents (the same both when the cartridge 100a is used and when the cartridge 100b is used) is written in the IC circuit part 151 of the RFID circuit element To, and then, the tag label tape 110 with print is cut to a predetermined length. By this operation, the RFID label T1a for UHF band (UHF label) or the RFID label T1b for HF band (HF label) can be produced.

FIG. 14 is a functional block diagram illustrating a detailed function of the radio frequency circuits.

In FIG. 14, the radio frequency circuit 21' is provided with the UHF communication processing portion 21A connected to the antenna 14a and the HF communication processing portion 21B connected to the antenna 14b.

The UHF communication processing portion 21A performs communication to the RFID circuit element To provided at the tag label tape 110 with print from the cartridge 100a through the antenna 14a when the cartridge 100a corresponding to the UHF band communication is attached to the cartridge holder 90. On the other hand, the HF communication processing portion 21B performs communication to the RFID circuit element To provided at the tag label tape 110 with print from the cartridge 100b through the antenna 14b when the cartridge 100b corresponding to the HF band communication is attached to the cartridge holder 90. That is, the UHF communication processing portion 21A and the HF communication processing portion 21B are selectively used according to a signal from the control circuit 30 (which will be described later), and the corresponding antenna 14a or 14b is selectively used for information transmission and reception. The antenna 14a and the UHF communication processing portion 21A or the antenna 14b and the HF communication processing portion 21B constitute the individual tag access device, respectively, described in each claim. At least a part or the whole of the antenna or the transmission and reception portion may be made common in configuration (=single common tag access device) by an appropriate method.

The UHF communication processing portion 21A and the HF communication processing portion 21B are provided with substantially the same functional configuration as those of the radio frequency circuit 21a and the radio frequency circuit 21b, respectively, described using FIG. 3 in the first embodiment.

That is, in the UHF communication processing portion 21A, a transmitting portion 412A (equivalent to the transmitting portion 32 in FIG. 3) having a crystal oscillator 430A, a PLL 431A, a VCO 432A, a transmission multiplying circuit 416A, and a variable transmission amplifier 417A provided with the equivalent functions corresponding to each of the crystal oscillator 35, the PLL 36, the VCO 37, the transmission multiplying circuit 38, and the variable transmission amplifier 39. In the UHF communication processing portion 21A, a receiving portion 413A (equivalent to the receiving portion 33 in FIG. 3) is provided having an I-phase receiving signal multiplying circuit 418A, an I-phase bandpass filter 419A, an I-phase receiving signal amplifier 421A, an I-phase limiter 420A, a phase shifter 427A, a Q-phase receiving signal multiplying circuit 422A, a Q-phase bandpass filter 423A, a Q-phase receiving signal amplifier 425A, a Q-phase limiter 424A, and an RSSI circuit 426A provided with the functions equivalent to those of the I-phase receiving signal multiplying circuit 40, the I-phase bandpass filter 41, the I-phase receiving signal amplifier 43, the I-phase limiter 42, the phase shifter 49, the Q-phase receiving signal multiplying circuit 44, the Q-phase bandpass filter 45, the Q-phase receiving signal amplifier 47, the Q-phase limiter 46, and the RSSI circuit 48. The transmitting portion 412A and the receiving portion 413A are connected to the antenna 14a through a transmit-receive splitter 414A having a function equivalent to that of the transmit-receive splitter 34 in FIG. 3. For the generated carrier wave, a frequency in the UHF band (ultrahigh frequency at 2.45 GHz, for example) is used.

In the HF communication processing portion 21B, a transmitting portion 412B (equivalent to the transmitting portion 32 in FIG. 3) having a crystal oscillator 430B, a PLL 431B, a VCO 432B, a transmission multiplying circuit 416B, and a variable transmission amplifier 417B provided with the equivalent functions corresponding to each of the crystal oscillator 35, the PLL 36, the VCO 37, the transmission multiplying circuit 38, variable transmission amplifier 39 in FIG. 3. In the HF communication processing portion 21B, a receiving portion 413B (equivalent to the receiving portion 33 in FIG. 3) is provided having an I-phase receiving signal multiplying circuit 418B, an I-phase bandpass filter 419B, an I-phase receiving signal amplifier 421B, an I-phase limiter 420B, a phase shifter 427B, a Q-phase receiving signal multiplying circuit 422B, a Q-phase bandpass filter 423B, a Q-phase receiving signal amplifier 425B, a Q-phase limiter 424B, and an RSSI circuit 426B provide with the functions equivalent to those of the I-phase receiving signal multiplying circuit 40, the I-phase bandpass filter 41, the I-phase receiving signal amplifier 43, the I-phase limiter 42, the phase shifter 49, the Q-phase receiving signal multiplying circuit 44, the Q-phase bandpass filter 45, the Q-phase receiving signal amplifier 47, the Q-phase limiter 46, and the RSSI circuit 48. The transmitting portion 412B and the receiving portion 413B are connected to the antenna 14b through a transmit-receive splitter 414B having a function equivalent to that of the transmit-receive splitter 34 in FIG. 3. For the generated carrier wave, a frequency in the HF band (high frequency at 13.56 MHz, for example) is used.

FIG. 15 is a flowchart illustrating a control procedure executed by the control circuit 30 at the production of the RFID label by the apparatus 4D for producing RFID labels of this embodiment. This flow is started when the apparatus 4D for producing RFID labels is operated.

First, at Step S21, similarly to Step S11 in FIG. 10 in the second embodiment, an operation signal of an operator is input through the operating device such as a keyboard of the operation terminal 2 (command input portion) through the input/output interface 31. This operation signal includes a tag label production command for producing the RFID label T, printing data to be printed on the RFID label T, and communication data to be written in the RFID circuit element To. In this embodiment, when the RFID label T is to be produced, unlike the first embodiment, both the UHF label T1a and the HF label T1b are produced in a lump sum at the same time (the function equivalent to that of the plural-type label production processing mode is executed all the time). However, the UHF label production mode and the HF label production mode may be made executable, as same as mentioned above.

After that, the routine goes to Step S22, where an attachment command of the HF cartridge is output to the cartridge switching control portion 29. By this operation, as mentioned above, the cartridge switch 81 attaches the HF cartridge 100b to the cartridge holder 90.

Then, the routine goes to Step S23, where the RFID label production processing corresponding to the HF band is executed. That is, a control signal is output to the cartridge shaft driving circuit 24, the print head driving circuit 25, the HF communication processing portion 21B, and the solenoid driving circuit 27 for control in coordination with each other. As mentioned above, the cover film 103 and the base tape 101 of the cartridge 100b are fed, and the cover film 103 is printed and bonded with the base tape 101 together. Information writing is performed using the RFID circuit element To of the formed tag label tape 110 with print and the HF band through the antenna 14b, cutting is performed to produce the RFID label T1b for HF band. At this time, if the production of the HF label is successfully finished without any error in the feeding, printing, communication, cutting and the like, the fact is detected by an appropriate method (various sensors and the like) and at the next Step S 24, it is determined if the production of the HF label T1b has been successful based on the detection result.

If the HF label production has been successful, the determination at Step S24 is satisfied, and the routine goes to Step S25. If the HF label production has not been successful, the determination is not satisfied, and the routine goes to Step S29.

At Step S25, an attachment command of the UHF cartridge is output to the cartridge switching control portion 29. By this operation, as mentioned above, the cartridge switch 81 attaches the UHF cartridge 10a to the cartridge holder 90.

Then, the routine goes to Step S26, where the RFID label production processing corresponding to the UHF band is executed. That is, a control signal is output to the cartridge shaft driving circuit 24, the print head driving circuit 25, the UHF communication processing portion 21A, and the solenoid driving circuit 27 for control in coordination with each other as in Step S23. That is, the cover film 103 and the base tape 101 of the cartridge 100a are fed, and the cover film 103 is printed and bonded with the base tape 101 together, information writing is performed using the RFID circuit element To of the formed tag label tape 110 with print and the UHF band through the antenna 14a, cutting is performed to produce the RFID label T1a for UHF band. At this time, if the production of the UHF label is successfully finished without any error in the feeding, printing, communication, cutting and the like, the fact is detected by an appropriate method (various sensors and the like) and at the next Step S27, it is determined if the production of the UHF label T1a has been successful based on the detection result.

If the UHF label production has been successful, the determination at Step S27 is satisfied, and the routine goes to Step S28. If the UHF label production has not been successful, the determination is not satisfied, and the routine goes to Step S29. The order of Step S22 to Step S24 and Step S25 to Step S27 may be switchable.

At Step S28, similarly to Step S16, according to success of the HF label production at Step S24 and success of the UHF label production at Step S27, a printing success signal is transmitted to the operation terminal 2 through the input/output interface 31 and the network 3. On the other hand, at Step S29, similarly to Step S17, according to failure of the HF label production at Step S24 and failure of the UHF label production at Step S27, an error signal is transmitted to the operation terminal 2 through the input/output interface 31 and the network 3.

When Step S28 or Step S29 is completed, this routine is finished.

In the above, Step S23 and Step S26 constitute a coordination control portion to control the feeding device and the tag access device in coordination with each other so that when the RFID label production command is input by the command input portion, the plural types of the RFID labels corresponding to the command are produced in a lump sum using the plural types of the RFID circuit elements, respectively, as described in each claim.

As mentioned above, in the apparatuses 4D for producing RFID labels according to the third embodiment of the present invention, the control circuit 30 controls each portion according to the RFID label production command included in the operation signal output from the operation terminal 2 and sequentially performs the HF label production processing and UHF label production processing. That is, either one of the cartridges 100 (the cartridge 100b in the above example) is first selected and set by the cartridge switch 81, the base tape 101 is fed, information writing is performed by information transmission and reception at a frequency corresponding to the RFID circuit element To (HF band in this example), and the RFID label T1b is produced. Sequentially to this as in a lump sum, the other of the cartridges 100 (the cartridge 100a in the above example) is selected and set by the cartridge switch 81, the base tape 101 is fed, information writing (which is substantially the same as that at communication in the HF band) is performed by information transmission and reception at a frequency corresponding to the RFID circuit element To (UHF band in this example), and the RFID label T1a is produced.

As mentioned above, similarly to the first and second embodiments, with the RFID label production command in a single operation of the operation terminal 2, the RFID labels T1a, T1b having substantially the same information and different communication frequencies (UHF band, HF band) can be produced at the same time. By this operation, a plurality of types of communication frequencies (ultrahigh frequency and high frequency in this example) with the respective advantages and disadvantages are used at the same time and the disadvantages of the communication frequencies can be compensated by each other (the advantages of the high frequency and ultrahigh frequency can be utilized while compensating for the respective disadvantages in this example), and the RFID label capable of highly reliable information communication can be produced.

Particularly in this embodiment, the cartridges 100a, 100b can be set in the common feeding path and fed by the feeding roller drive shaft 12, which is the common feeding device, and the print can be made by the print head 10, which is the common printing device. As a result, as compared with the first and second embodiments using the separate feeding device and printing device, the number of parts and manufacturing costs can be reduced and the size of the entire apparatus can be made smaller.

By automatically switching the cartridges 100 by the cartridge switch 81 as above, there is no need for the operator to switch the plurality of types of cartridges 100, which can improve convenience.

A fourth embodiment of the present invention will be described referring to FIGS. 16 to 20. This embodiment is an embodiment in which the RFID circuit element for HF-band communication and the RFID circuit element for UHF-band communication are arranged in a mixed manner on the base tape in the single cartridge. The same reference numerals and symbols are given to the portions equivalent to those in the first to third embodiments, and the description will be omitted or simplified as appropriate.

FIG. 16 is a conceptual diagram illustrating the RFID label manufacturing system 1 provided with an apparatus 4E for producing RFID labels of this embodiment and corresponds to FIGS. 7 and 11 in the second and third embodiments. FIG. 17 is a schematic diagram illustrating an outline configuration of the apparatus 4E for producing RFID labels. FIG. 18 is a conceptual block diagram illustrating a detailed structure of the apparatus 4E for producing RFID labels.

In FIGS. 16 to 18, in the apparatus 4E for producing RFID labels of this embodiment, to the cartridge holder 90 (mixed container installation holder), a cartridge 100c (mixed RFID circuit element container) accommodating a first roll 102' (tag tape roll) around which a base tape 101' (tag tape, tag medium) with the RFID circuit element To corresponding to the UHF-band communication and the RFID circuit element To corresponding to the HF-band communication being mixedly arranged (arranged alternately along the longitudinal direction in this example) as shown in FIG. 19 is wound (around a axis substantially orthogonal to the tape longitudinal direction) is detachably attached. As a result, a single type of the RFID label of the RFID label T1a for UHF and the RFID label T1b for HF can be produced from the single base tape 101' (the detail will be described later). Corresponding to that, the cartridge switch 81 and the cartridge control portion 29 are omitted.

On the upper face of the apparatus 4E for producing RFID labels, the opening/closing lid 5 substantially corresponding to the apparatus 4A or 4B for producing RFID labels is provided, and on the front face, the discharge portion 6 for taking out the RFID labels T1a and T1b is also provided similarly to the apparatus 4A or 4B for producing RFID labels.

The configuration other than the above is substantially the same as that of the apparatus 4D for producing RFID labels and the description will be omitted.

In the apparatus 4E for producing RFID labels in this embodiment with the above configuration, the cover film 103 and the base tape 101' in the cartridge 100c is fed by the driving force of the feeding roller drive shaft 12. Then, similarly to the third embodiment, the print R is made by the print head 10 on the cover film 103 and moreover, the base tape 101' is bonded so as to form the tag label tape 110' with print (tag medium). Then, through the RFID circuit element To provided at the tag label tape 110' with print (base tape 101') and the antenna 14a for UHF band communication (or antenna 14b for HF band communication) provided on the downstream side in the feeding direction (of the single feeding path) than the print head 10, information is transmitted and received by a radio frequency in the UHF band (or HF band). By this information transmission and reception, information with substantially the same contents (the same both when the RFID circuit element To for UHF band is used and when the RFID circuit element To for HF band is used) is written in the IC circuit part 151 of the RFID circuit element To, and then, the tag label tape 110' with print is cut to a predetermined length. By this operation, the RFID label T1a for UHF band (UHF label) or the RFID label T1b for HF band (HF label) is produced.

FIG. 20 is a flowchart illustrating a control procedure executed by the control circuit 30 at the production of the RFID label by the apparatus 4E for producing RFID labels of this embodiment and corresponds to FIG. 15 in the third embodiment. The same reference numerals and symbols are given to the portions equivalent to those in FIG. 15, and the description will be omitted or simplified as appropriate.

In the flow in FIG. 20, Step S22 and Step S25 in the flow in FIG. 15 are omitted. This flow is started when the apparatus 4E for producing RFID labels is operated.

That is, at Step S21, similarly to FIG. 15, an operation signal (including a RFID label production command and the like) of an operator is input through the operating device such as a keyboard of the operation terminal 2 (command input portion).

After that, the routine goes to step S23, where the RFID label production processing corresponding to the HF band is executed similarly to the above. That is, a control signal is output to the cartridge shaft driving circuit 24, the print head driving circuit 25, the HF communication processing portion 21B, and the solenoid driving circuit 27 for control in coordination with each other. Then, similarly to the above, the cover film 103 and the base tape 101' of the cartridge 100c are fed, the cover film 103 is printed and bonded with the base tape 101' together, and information writing is performed using the RFID circuit element To of the formed tag label tape 110' with print and the HF band. At this time, since the RFID circuit element To for UHF-band communication and the RFID circuit element To for HF-band communication are mixedly arranged on the base tape 101' (the tag label tape 110' with print after bonding) as mentioned above, the control circuit 30 performs appropriate feeding control for feeding and positioning so that the RFID circuit element To for HF-band communication is located in a communication range of the antenna 14b (such as optical/magnetic detection with a sensor of an identifier provided on the tape and feeding control based on the detection result, for example). Then, after the information writing, the tape is cut so as to form the RFID label T1b for HF band.

At this time, similarly to the above, if the production of the HF label is successfully finished without any error in the feeding, printing, communication, cutting and the like, the fact is detected by an appropriate method (various sensors and the like) and at the next Step S24, it is determined if the production of the HF label T1b has been successful.

If the HF label production has been successful, the determination at Step S24 is satisfied, and the routine goes to Step S26. If the HF label production has not been successful, the determination is not satisfied, and the routine goes to Step S29.

At Step S26, similarly to the above, the RFID label production processing corresponding to the HF band is executed. That is, a control signal is output to the cartridge shaft driving circuit 24, the print head driving circuit 25, the UHF communication processing portion 21A, and the solenoid driving circuit 27 for control in coordination with each other. Then, similarly to the above, the cover film 103 and the base tape 101' of the cartridge 100c are fed, the cover film 103 is printed and bonded with the base tape 101' together, and information writing is performed using the RFID circuit element To of the formed tag label tape 110' with print and the UHF band through the antenna 14a. At this time, similarly to the above, the feeding control is performed by the control circuit 30 for feeding and positioning so that the RFID circuit element To for UHF-band communication is located in a communication range of the antenna 14a. Then, after the information writing, the tape is cut so as to form the RFID label T1a for UHF band.

At this time, similarly to the above, if the production of the UHF label is successfully finished, the fact is detected, and at Step S27, it is determined if the production of the UHF label T1a has been successful.

If the UHF label production has been successful, the determination at Step S27 is satisfied, and the routine goes to Step S28. If the UHF label production has not been successful, the determination is not satisfied, and the routine goes to Step S29. The order of Step S23 and Step S24 and Step S26 and Step S27 may be switchable.

Since Step S28 and step S29 are the same procedure as that in FIG. 15 above, the description will be omitted.

Also in this embodiment, Step S23 and Step S26 also constitute a coordination control portion to control the feeding device and the tag access device in coordination with each other so that when the RFID label production command is input by the command input portion, the plural types of the RFID tag labels corresponding to the command are produced in a lump sum using the plural types of the RFID circuit elements, respectively, as described in each claim.

As mentioned above, in the apparatus 4E for producing RFID labels in the fourth embodiment of the present invention, the control circuit 30 controls each portion according to the RFID label production command included in the operation signal output from the operation terminal 2 and sequentially performs the HF label production processing and UHF label production processing (the order may be switched). That is, in the above example, the base tape 101' of the cartridge 100c (tag label tape 110' with print) is fed, first, information writing is performed by information transmission and reception in the HF band to the RFID circuit element To for HF band, and the RFID label T1b is produced. After that, sequentially to this as in a lump sum, the base tape 101' (tag label tape 110' with print) is fed, information writing (which is substantially the same as that at communication in the HF band) is performed by information transmission and reception in the UHF band to the RFID circuit element To for UHF band, and the RFID label T1a is produced.

As mentioned above, similarly to the third embodiment, with the RFID label production command in a single operation of the operation terminal 2, the RFID labels T1a, T1b having substantially the same information and different communication frequencies (UHF band, HF band) can be produced at the same time. By this operation, a plurality of types of communication frequencies (ultrahigh frequency and high frequency in this example) with the respective advantages and disadvantages are used at the same time and the disadvantages of the communication frequencies can be compensated by each other (the advantages of the high frequency and ultrahigh frequency can be utilized while compensating for the respective disadvantages in this example), and the RFID label capable of highly reliable information communication can be produced.

Particularly in this embodiment, the cartridges 100a, 100b can be fed in the common feeding path, and the print can be made by the print head 10, which is the common printing device. As a result, as compared with the first and second embodiments using the separate feeding device and printing device, the number of parts and manufacturing costs can be reduced and the size of the entire apparatus can be made smaller.

Particularly in this embodiment, by arranging a plurality of types (for HF band, for UHF band) of the RFID circuit elements To in the single cartridge 100c and by producing the RFID label T using them, there is no need for the operator to switch the plurality of types of cartridges, which can improve convenience.

In the above, an example in which writing/reading of the RFID tag information and printing are performed with respect to the base tapes 101, 101' during feeding has been shown, but not limited to that, the printing and reading/writing may be performed by stopping the base tapes 101, 101' and the like at a predetermined position (and as for the reading/writing, in a state of being held by a predetermined feeding guide).

In the above, an example in which the tag label tapes 110, 110' with print for which printing and an access (reading or writing) to the RFID circuit element To have been finished is cut by the cutter 15 so as to produce the RFID label T has been described but not limited to that. That is, if label mounts separated in advance in a predetermined size corresponding to the label (so-called die-cut label) are continuously arranged on the tape being fed out of the roll, only the label mount (on which the RFID circuit element To having been accessed is provided and given corresponding print) is peeled off the tape after the tape is discharged from a carry-out exit 16 so as to produce the RFID label T without cutting by the cutter 15, and the present invention can be also applied to such a type.

Also, in the above, such a method is employed that the print is made on the cover film 103, which is separate from the base tapes 101, 101' provided with the RFID circuit element To, and they are bonded together, but not limited to that, a method (of a type without bonding) in which the print is made on a print-receiving tape layer (thermal layer, transfer layer, image receiving layer and the like) provided at the base tape may be applied to the present invention. Moreover, the present invention is not limited to a type that the RFID tag information is read out or written in from the IC circuit part 151 of the RFID circuit element To and the printing for identifying the RFID circuit element To is made by the print head 10. The printing does not necessarily have to be made but the present invention may be applied to a type that only reading or writing of the RFID tag information is made.

Furthermore, in the above, a case in which the base tapes 101, 101' are wound around a reel member so as to constitute a roll, the roll is arranged in the cartridge 100 and the base tapes 101, 101' are fed out thereof has been described as an example, but not limited to that. For example, it may be so configured that a lengthy flat-paper state or strip-state tapes or sheets (including those formed by feeding out the tape wound around the roll and then, by cutting it to an appropriate length) on which at least one RFID circuit element To is arranged are stacked in a predetermined storage portion as a cartridge (flatly laminated in a tray-like container, for example), the cartridge is attached to the cartridge holder on the side of the apparatus for producing RFID labels and transferred and fed from the storage portion, and the print and writing are made so as to produce the tag labels.

Moreover, configuration to attach the roll directly and detachably to the side of the apparatus for producing RFID labels or configuration in which the lengthy flat-paper state or strip-state tapes or sheets are transferred one by one from outside the apparatus for producing RFID labels by a predetermined feeder mechanism and supplied into the apparatus for producing RFID labels are also possible. Furthermore, not limited to the type as the cartridge 100 that can be detachably attached to the side of the main body of the apparatus for producing RFID labels, the first roll may be provided as a so-called installation type or an integral type that can not be detachable with respect to the main body side. In these cases, too, the same effect as above can be obtained.

Also, other than the above, methods in the embodiments and variations may be combined in use as appropriate.

Though not specifically exemplified, the present invention should be put into practice with various changes made in a range not departing from its gist.

What is claimed is:

1. An apparatus for producing RFID labels comprising:
    a command input portion configured to input an RFID label production command for producing an RFID label;
    a feeding device configured to feed a tag medium provided with a plurality of types of RFID circuit elements having an IC circuit part storing information and a tag antenna transmitting and receiving information and corresponding to a plurality of types of communication frequencies, respectively;
    a tag access device configured to perform information transmission and reception using said plurality of types of communication frequencies with said plurality of types of RFID circuit elements of said tag medium fed by said feeding device; and
    a coordination control portion configured to control said feeding device and said tag access device in coordination with each other so that when said RFID label production command is input by said command inputting device, a plurality of types of said RFID labels corresponding to said RFID label production command are produced in a lump sum using said plurality of types of RFID circuit elements, respectively, wherein:
    said feeding device is a common feeding device provided singularly in common configured to feed a plurality of tag mediums corresponding to said plurality of types of RFID circuit elements;
    said tag access device includes a plurality of individual tag access devices or a single common tag access device, configured to transmit and receive information using both of said plurality of types of the communication frequencies selectively in connection with said plurality of types of RFID circuit elements; and
    said apparatus for producing RFID labels further comprises:
    a common printing device configured to make a predetermined print on said tag medium or on a print-receiving medium to be bonded to said tag medium, supplied by said common feeding device; and
    a container installation device configured to selectively extract one normal RFID circuit element container from a plurality of normal RFID circuit element containers and to set said one normal RFID circuit element container at a position feedable by said common feeding device, said one normal RFID circuit element accommodating the corresponding tag medium, wherein said common printing device is configured to make a predetermined print on said tag medium or on said print-receiving medium, supplied by said common feeding device from said normal RFID circuit element container installed by said container installation device.

2. The apparatus for producing RFID labels according to claim 1 wherein:

said feeding device feeds a tag medium provided with an RFID circuit element for high frequency with a high frequency as its communication frequency and an RFID circuit element for ultrahigh frequency with an ultrahigh frequency as its communication frequency, as said plurality of types of RFID circuit elements; and said tag access device performs information transmission and reception with said RFID circuit element for high frequency using the high frequency and performs information transmission and reception with said RFID circuit element for ultrahigh frequency using the ultrahigh frequency.

3. The apparatus for producing RFID labels according to claim 1 wherein:

said coordination control portion has a processing mode for plural type label productions in which said feeding device and said tag access device are controlled in coordination with each other so that a plurality of types of RFID labels using said plurality of types of RFID circuit elements, respectively, are produced in a lump sum and a processing mode for a single type label production in which said feeding device and said tag access device are controlled in coordination with each other so that an RFID label using a single type of the RFID circuit element is produced.

4. The apparatus for producing RFID labels according to claim 3 wherein:

said command input portion inputs said tag label production command including an identifier corresponding to said processing mode for plural type label productions or said processing mode for a single type label production; and said coordination control portion has a mode switching portion configured to switch between said processing mode for plural type label productions and said processing mode for a single type label production, according to said identifier included in said tag label production command.

* * * * *